United States Patent
Mori et al.

(10) Patent No.: US 7,559,024 B2
(45) Date of Patent: Jul. 7, 2009

(54) DOCUMENT PROCESSING APPARATUS AND METHOD

(75) Inventors: Yasuo Mori, Kanagawa (JP); Junichiro Kizaki, Kanagawa (JP); Satoshi Nishikawa, Kanagawa (JP); Junko Sato, Kanagawa (JP); Takuya Miyazato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 10/726,708

(22) Filed: Dec. 4, 2003

(65) Prior Publication Data

US 2004/0111675 A1    Jun. 10, 2004

(30) Foreign Application Priority Data

Dec. 10, 2002    (JP)    ............................. 2002-358315

(51) Int. Cl.
*G06F 15/00* (2006.01)

(52) U.S. Cl. .................. 715/273; 715/277; 715/204; 715/243; 715/253

(58) Field of Classification Search ................ 715/530, 715/273, 204, 243, 253, 277
See application file for complete search history.

(56) References Cited

U.S. PATENT DOCUMENTS

| | | | | |
|---|---|---|---|---|
| 4,586,035 A | * | 4/1986 | Baker et al. ................. | 345/157 |
| 5,181,162 A | * | 1/1993 | Smith et al. ................. | 715/530 |
| 5,363,480 A | * | 11/1994 | Usami et al. ................ | 715/517 |
| 5,428,721 A | * | 6/1995 | Sato et al. ................... | 345/650 |
| 5,555,362 A | * | 9/1996 | Yamashita et al. .......... | 715/517 |
| 5,586,316 A | * | 12/1996 | Tanaka et al. ................ | 707/4 |
| 5,694,609 A | * | 12/1997 | Murata ........................ | 715/513 |
| 5,895,476 A | * | 4/1999 | Orr et al. ..................... | 715/517 |
| 5,895,477 A | * | 4/1999 | Orr et al. ..................... | 715/517 |
| 5,903,902 A | * | 5/1999 | Orr et al. ..................... | 715/517 |
| 5,956,737 A | * | 9/1999 | King et al. ................... | 715/517 |

(Continued)

FOREIGN PATENT DOCUMENTS

JP    07-015679    2/1995

(Continued)

OTHER PUBLICATIONS

Design Intelligence, Inc., "Live Layout, The Challenge of Automated Presentation," Design Intelligence, Inc., product brochure, Mar. 1999, pp. 1-3.*

Everett, N. and King, J., "Dynamic solutions for Dynamic Presentations, Automated layout of variable data for on-demand delivery," Design Intelligence, Inc., White Pager, Mar. 1999, cover, table of contents, and pp. 1-16.*

(Continued)

*Primary Examiner*—Stephen S Hong
*Assistant Examiner*—Matthew J Ludwig
(74) *Attorney, Agent, or Firm*—Fitzpatrick, Cella, Harper & Scinto

(57) ABSTRACT

This invention relates to a document processing apparatus and method for a structured document formed by grouping original pages. The document processing apparatus according to this invention controls display of the image objects of either or both of a document structure and an original page contained in the document. The document processing apparatus includes an editor which edits the document so as to insert a new group containing a designated original page to a designated position in accordance with designation of the original page and the position on the displayed image objects. Display of the image objects is controlled for the document edited by the editor.

21 Claims, 24 Drawing Sheets

U.S. PATENT DOCUMENTS

| | | | |
|---|---|---|---|
| 2002/0087602 A1* | 7/2002 | Masuda et al. | 707/515 |
| 2003/0056176 A1 | 3/2003 | Tanaka et al. | 715/522 |
| 2003/0056179 A1 | 3/2003 | Mori | 715/530 |
| 2003/0056180 A1 | 3/2003 | Mori | 715/530 |
| 2003/0079177 A1* | 4/2003 | Brintzenhofe et al. | 715/500 |
| 2004/0187081 A1* | 9/2004 | Petz | 715/526 |

FOREIGN PATENT DOCUMENTS

| | | |
|---|---|---|
| JP | 2002-229976 | 8/2002 |
| JP | 2003-016056 | 1/2003 |

OTHER PUBLICATIONS

McDonald, M., "Processing Composite Content," Design Intelligence, Inc., White Paper, Oct. 1, 1998, pp. 1-35.*

Design Intelligence, Inc., "Patents," Design Intelligence, Inc., Web page, web.archive.org/web/20000824165931/www.design-intelligence.com/patentdetails.html, downloaded pp. 1-3.*

Japanese Office Action dated Aug. 13, 2007 w/English translation.

* cited by examiner

FIG. 4A

| NO | ATTRIBUTE INFORMATION | | REMARKS |
|---|---|---|---|
| 1 | PRINT METHOD | SINGLE-SIDED / DOUBLE-SIDED / BOOKBINDING PRINTING | |
| 2 | PAPER SIZE | ORIGINAL SIZE / FIXED SIZE | · Z-FOLD IS DESIGNATED WHEN "A4 + A3", "B4 + B3", OR "LETER + LEDGER (11 × 17)" IS DESIGNATED<br>· ORIGINAL SIZE OF FIRST CHAPTER / PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | · SELECTABLE ONLY FOR FIXED SIZE |
| 4 | BINDING MARGIN / BINDING DIRECTION | | · SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | · LAYOUT POSITION : NINE PATTERNS<br>· X1 PRINTING CAN BE DESIGNATED |
| 6 | ENLARGEMENT / REDUCTION | ON / OFF | ON / OFF CAN BE AUTOMATICALLY DESIGNATED WHEN PAPER SIZE IS FIXED SIZE OR N-up PRINTING IS SELECTED |
| 7 | WATERMARK | | · WATERMARK CAN BE DESIGNATED INDIVIDUALLY IN LOGICAL OR PHYSICAL PAGES<br>· ALL CHAPTERS / PAGES ARE TARGETED |

FIG. 4B

| | | | |
|---|---|---|---|
| 8 | HEADER / FOOTER | | • HEADER / FOOTER CAN BE DESIGNATED INDIVIDUALLY IN LOGICAL OR PHYSICAL PAGES<br>• ALL CHAPTERS / PAGES ARE TARGETED |
| 9 | DELIVERY METHOD | STAPLING / PUNCH HOLE | • STAPLING / PUNCHING ONLY IN SINGLE- / DOUBLE-SIDED PRINTING<br>• STAPLING AT ONE / TWO PORTIONS |
| 10 | DETAILS OF BOOKBINDING | OPENING DIRECTION / SADDLE STITCH / ENLARGEMENT & REDUCTION DESIGNATION / BINDING MARGIN / FASCICLE DESIGNATION, etc. | • ONLY IN BOOKBINDING PRINTING |
| 11 | FRONT / BACK COVER | | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING PRINTING CANNOT BE DESIGNATED |
| 13 | SLIP SHEET | | • FEED PORT (INCLUDING INSERTER) IS DESIGNATED<br>• ORIGINAL DATA CAN BE PRINTED ON INSERTED PAPER<br>• BOOKBINDING PRINTING CANNOT BE DESIGNATED |
| 14 | CHAPTERING | "NONE" / "PAGE BREAK" / "PAPER CHANGE" | • "PAPER CHANGE" IS FIXED WHEN INDEX SHEET OR SLIP SHEET IS DESIGNATED<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | ORIGINAL SIZE / FIXED SIZE | • "PAPER CHANGE" IS AUTOMATICALLY DESIGNATED WHEN FIXED SIZE IS SELECTED<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK |
| 2 | PAPER DIRECTION | PORTRAIT / LANDSCAPE | • SELECTABLE ONLY FOR FIXED SIZE |
| 3 | N-up PRINTING DESIGNATION | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 4 | ENLARGEMENT / REDUCTION | ON / OFF | • ON / OFF CAN BE AUTOMATICALLY DESIGNATED WHEN PAPER SIZE IS FIXED SIZE OR N-up PRINTING IS SELECTED |
| 5 | WATERMARK | DISPLAY / NON-DISPLAY | • WHETHER TO DISPLAY ALL WATERMARKS DESIGNATED BY BOOK IS DESIGNATED |
| 6 | HEADER / FOOTER | DISPLAY / NON-DISPLAY | • WHETHER TO DISPLAY ALL HEADERS / FOOTERS DESIGNATED BY BOOK IS DESIGNATED |
| 7 | DELIVERY METHOD | STAPLING | • STAPLING CAN BE SET OFF WHEN STAPLING IS DESIGNATED BY BOOK<br>DEFAULT VALUE IS "ON" |

FIG. 6

| NO | ATTRIBUTE INFORMATION | | REMARKS |
|---|---|---|---|
| 1 | PAGE ROTATION DESIGNATION | | • 0°/90°/180°/270° CAN BE DESIGNATED |
| 2 | WATERMARK | DISPLAY / NON-DISPLAY | • WHETHER TO DISPLAY ALL WATERMARKS DESIGNATED BY BOOK IS DESIGNATED |
| 3 | HEADER / FOOTER | DISPLAY / NON-DISPLAY | • WHETHER TO DISPLAY ALL HEADERS / FOOTERS DESIGNATED BY BOOK IS DESIGNATED |
| 4 | ZOOM | 50% - 200% | • MAGNIFICATION RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS AND ARBITRARY POSITION IS DESIGNATED |
| 6 | ANNOTATION | | |
| 7 | VARIABLE ITEM | | |
| 8 | PAGE SEPARATION | | |

FIG. 23

| ATTRIBUTE SETTING METHOD IN CHAPTER SEPARATION |
|---|

⦿ INHERIT SETTING OF ORIGINAL CHAPTER

○ CLEAR TO DEFAULT VALUE

○ SET FIXED VALUE

[ NEXT > ]

[ OK ]  [ CANCEL ]

DOCUMENT PROCESSING APPARATUS AND METHOD

FIELD OF THE INVENTION

The present invention relates to a document processing method and system, for example, a document processing method and system which combine output data generated by various programs such as a document processing program and image editing program into one document and provide an editing function for the document.

BACKGROUND OF THE INVENTION

A conventional printing system can only adopt either a method of holding printing settings only for a whole document or a method of holding printing settings only for a part. A printing system using the former method cannot perform partial settings for a part of a document. For example, in N-page printing (printing method of reducing and laying out original images of N pages on one sheet, as needed) as typical layout setting, 2-page printing can be set as a setting for a whole document, but cannot be changed to 4-page printing for a part of the document.

In the latter method, no setting can be done for a whole document, and attributes such as the document form are held for each part. The document form and printing settings must be changed for each part, and cannot be changed at once for the whole document.

Under the present circumstances, the present applicant has filed a document processing system in which data serving as document contents and setting values such as the form are held in a hierarchical tree structure and various setting items can be set for a whole document and also each layer (U.S. Ser. No. 10/241,633). This system can unify the form of a whole document and also partially change settings by holding the setting items of the whole document and the setting items of each layer.

As document editing operation, the document processing system can not only change setting values, but also edit the document structure so as to move or copy an arbitrary partial tree such as each page or a set of pages. In inserting new data, or moving or copying existing data, a whole document can be unified, or an exceptional setting can be partially set by maximizing the feature of hierarchically holding data and setting values.

In the document editing system, the data structure is expressed by the tree format in order to hold data in the hierarchical structure. Also in displaying a document, the document is displayed by a tree representing the document structure. In this tree structure, a node corresponding to a tree knar specifies a part belonging to the node. The user can edit data while checking the display of the tree structure.

To separate a given intermediate node (node except a root and leaf) into a plurality of nodes, a blank node (to which no part belongs) in the same layer as that of the node to be separated is created. Of parts belonging to the node to be separated, only a target part is moved to the blank node prepared in advance, resulting in complicated operation. Since each node holds attributes, the attributes of the node to be separated must be manually copied to the blank node.

The print format and form are set for each part belonging to a node in each layer, and thus separation of an intermediate node is indispensable in changing document settings. This is because the settings of only a separated part or a part left after separation can be changed without changing the settings of another part. However, this operation is complicated, as described above, and the document editing/printing efficiency is low with poor operability.

SUMMARY OF THE INVENTION

The present invention has been made in consideration of the above situation, and has as its object to provide a document processing method capable of editing with setting values in separating and editing an intermediate node by utilizing the feature of hierarchically holding data and setting values when the hierarchical structure is edited in a document processing method of hierarchically holding data and setting values.

It is another feature of the present invention to provide a document processing method in which a new separated node can inherit the setting value of an original intermediate node.

It is still another feature of the present invention to provide a document processing method capable of adding a predetermined setting value to a new separated node.

It is still another feature of the present invention to provide a document processing apparatus in which, while the image objects of either or both of a document structure and an original page contained in a document are confirmed on the display screen in editing a structured document, an original page and position on the displayed image objects are designated, the document is so edited as to insert a new group containing the designated original page to the designated position, and the edited document can also be confirmed on the display screen. The structured document according to the present invention includes a document structurally described in the XML, a structural document containing a PDF in the page description language or data created by a wordprocessing document, and a document obtained by incorporating the printing settings of a job ticket or the like in the above document.

It is still another feature of the present invention to provide a node editing method which improves the node separation operability by utilizing the feature of hierarchically holding data and setting values when data is moved, copied, and pasted in a document processing system which hierarchically holds data and setting values.

To achieve at least one of the above features, the present invention has the following arrangement.

(1) A document processing apparatus for a structured document formed by grouping original pages comprises display control means for controlling display of image objects of either or both of a document structure and an original page contained in the document, and editing means for editing the document so as to insert a new group containing a designated original page to a designated position in accordance with designation of the original page and the position on the image objects displayed by the display control means, wherein the display control means controls display of the image objects for the document edited by the editing means.

(2) Preferably in (1), the display control means displays a selection window capable of selecting whether to edit the document so as to insert the new group containing the designated original page to the designated position or whether to move the designated original page to the designated position in accordance with designation of the original page and the position on the image objects, and the editing means performs editing processing in accordance with selection in the selection window.

(3) Preferably in (1), the group has a group attribute, and the editor causes the new inserted group to inherit an attribute of the group to which the designated original page belongs.

(4) Preferably in (1), the group has a group attribute, and the editor gives a predetermined attribute to the new inserted group.

(5) Preferably in (1), the group has a group attribute, the editor causes the display controller to display a selection window capable of selecting whether to cause the new inserted group to inherit an attribute of the group to which the designated original page belongs, or whether to give a predetermined attribute, and the editor performs editing processing in accordance with selection in the selection window.

(6) Preferably in (1), the group of the original pages is made to correspond to a layer of a data structure having at least one chapter which forms a document, and at least one original page is made to correspond to a lower layer of the data structure of the chapter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are tables showing a list of book attributes;

FIG. 5 is a table showing a list of chapter attributes;

FIG. 6 is a table showing a list of page attributes;

FIG. 23 is a view showing an example of a chapter attribute setting GUI.

DETAILED DESCRIPTION OF THE PREFERRED EMBODIMENT

A preferred embodiment of the present invention will be described in detail below with reference to the accompanying drawings.

[Outline of Document Processing System According to Embodiment]

The outline of a document processing system according to an embodiment of the present invention will be described with reference to FIGS. 1 to 13. The document processing system converts a data file created by a general application into a page-storing file by a printing data save driver. A printing control application provides a function of editing an electronic original file. For a page-storing file edited by the printing control application, an editing information file corresponding to the page-storing file is generated and saved. The contents of the page-storing file are read out for printing by a printing application (also called a despooler) via the printing control application. In this example, a general application, printing data save driver, printing control application, and printing application are separately described for distinction between these functions. However, a package provided to the user is not limited to them, and an application or graphic engine as a combination of them may be provided, details of which will be described below.

<Example of Hardware Configuration of Document Processing System According to Embodiment>

Figure 2:
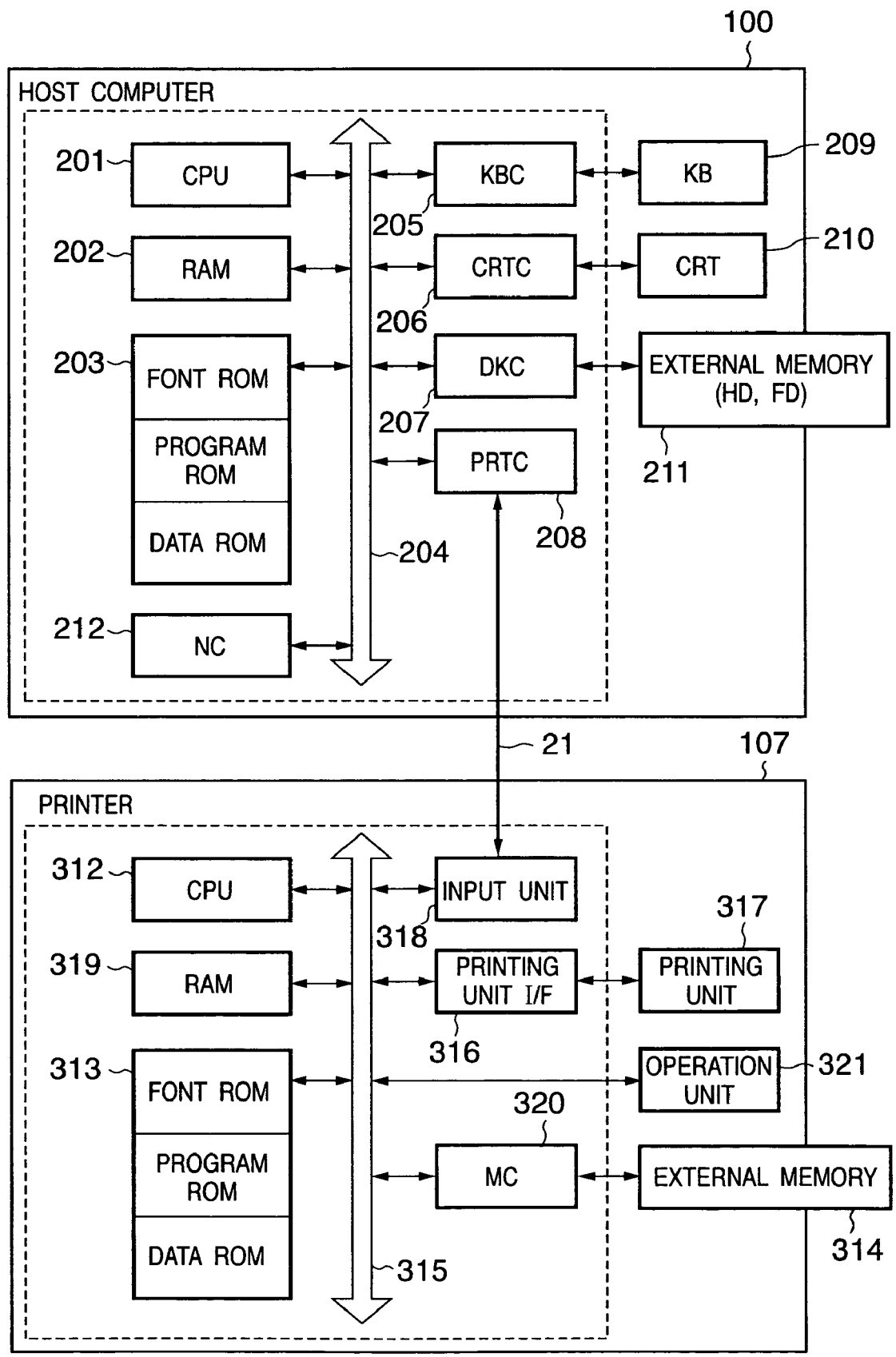
FIG. 2 is a block diagram showing an example of a hardware configuration which implements the document processing system according to the embodiment.

FIG. 2 is a block diagram for explaining the configuration of the document processing system according to the embodiment. The present invention can be applied to a single apparatus, a system comprised of a plurality of devices, or a system which is connected via a network such as a LAN or WAN and performs processing, as far as the function of the present invention is executed.

In FIG. 2, a host computer 100 comprises a CPU 201, RAM 202, ROM 203, and the like. The CPU 201 executes document processing in which figures, images, characters, tables (including spreadsheets and the like), and the like coexist, on the basis of a document processing program or the like stored in the program ROM of the ROM 203 or an external memory 211. The CPU 201 comprehensively controls devices connected to a system bus 204. The program ROM area of the ROM 203 or the external memory 211 stores, e.g., an operating system program (to be referred to as an OS hereinafter) serving as the control program of the CPU 201. The font ROM area of the ROM 203 or the external memory 211 stores, e.g., font data used in document processing. The data ROM area of the ROM 203 or the external memory 211 stores various data used in document processing or the like. The RAM 202 functions as a main memory, work area, or the like for the CPU 201.

A keyboard controller (KBC) 205 controls a key input from a keyboard 209 or a pointing device (not shown). A CRT controller (CRTC) 206 controls the display of a CRT display (CRT) 210. A disk controller (DKC) 207 controls access to the external memory 211 such as a hard disk (HD) or Floppy® disk (FD). The external memory 211 stores a boot program, various applications, font data, user files, edited files, a printer control command generation program (to be referred to as a printer driver hereinafter), and the like. A printer controller (PRTC) 208 is connected to a printer 107 via a bidirectional interface (interface) 21, and executes communication control processing with the printer 107.

The CPU 201 executes, e.g., rasterization processing of an outline font to a display information RAM set in the RAM 202, and enables WYSIWYG on the CRT 210. The CPU 201 opens various registered windows and executes various data processes on the basis of commands designated on the CRT 210 with a mouse cursor (not shown) or the like. When the user executes printing, he/she opens a printing setting window provided by the printer driver, and can perform setting of a printer and setting of a printing processing method to the printer driver that includes selection of a printing mode.

The printer 107 is controlled by a CPU 312. The printer CPU 312 outputs an image signal as output information to a printing unit (printer engine) 317 connected to a system bus 315 on the basis of a control program stored in the program ROM area of a ROM 313 or a control program stored in an external memory 314. The program ROM area of the ROM 313 stores, e.g., the control program of the CPU 312. The font ROM area of the ROM 313 stores, e.g., font data used to generate the output information. The data ROM area of the ROM 313 stores, e.g., information used in the host computer for a printer having no external memory 314 such as a hard disk.

The CPU 312 can communicate with the host computer via an input unit 318, and notify the host computer 100 of internal printer information or the like. A RAM 319 functions as a main memory, work area, or the like for the CPU 312, and the memory capacity can be expanded by an optional RAM connected to an expansion port (not shown). The RAM 319 is used as an output information mapping area, environment data storage area, NVRAM, or the like. Access to the external memory 314 such as a hard disk (HD) or IC card is controlled by a memory controller (MC) 320. The external memory 314 is connected as an option, and stores font data, emulation programs, form data, and the like. Reference numeral 321 denotes an operation panel having operation switches, an LED display, and the like.

The number of external memories 314 is not limited to one, and a plurality of external memories 314 may be arranged. A plurality of external memories which store an option card and a program for interpreting the printer control languages of different language systems in addition to built-in fonts may be connected. Further, an NVRAM (not shown) may be adopted to store printer mode setting information from the operation unit 321.

<Example of Software Configuration of Document Processing System According to Embodiment>

Figure 1:
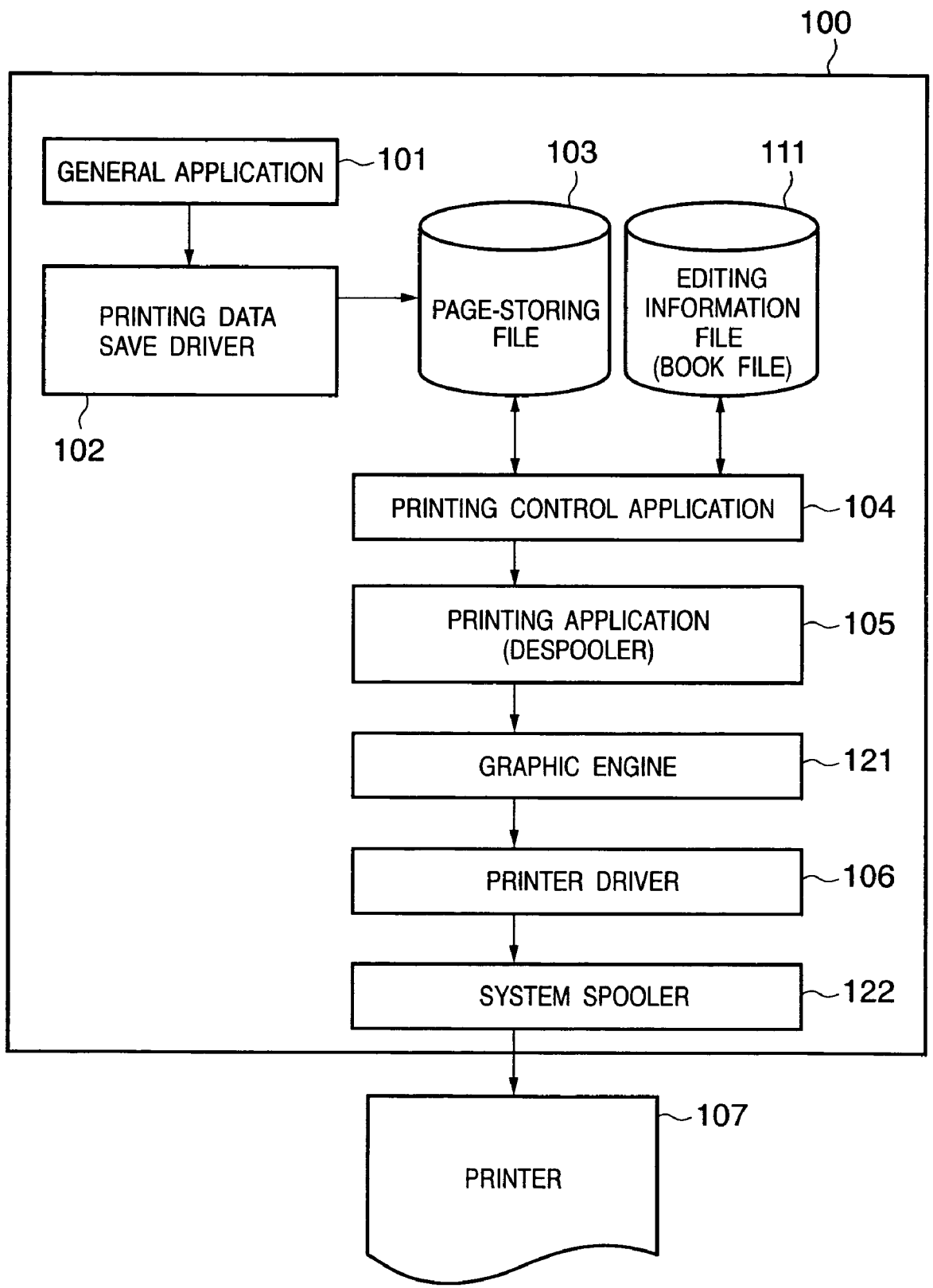
FIG. 1 is a block diagram showing an example of the software configuration of a stand-alone document processing system according to an embodiment.

FIG. 1 is a block diagram showing the software configuration of the document processing system according to the embodiment.

The document processing system is implemented by a digital computer 100 (to be also referred to as a host computer hereinafter) as an embodiment suited to the document processing apparatus (information processing apparatus) of the present invention. A general application 101 is an application program which provides functions such as wordprocessing, spreadsheet, photo-retouch, draw, paint, presentation, and text editing. The general application 101 has a function of requesting printing processing of an operating system (OS). Such applications utilize a predetermined interface provided by the OS in printing application data such as created document data or image data. To print created data, the application 101 transmits an output command in a predetermined format to the output module of the OS providing the interface. The output module which has received the output command converts it into a format processible by an output device such as a printer, and outputs the converted command. Since the format processible by the output device changes depending on the type of device, the manufacturer, and the model, a device driver is provided for each device. The OS converts a command by using the device driver, generates printing data, and combines printing data by JL (Job Language) to generate a printing job.

When the OS is Microsoft Windows®, the output module is a GDI (Graphic Device Interface) module. The application 101 calls a GDI function by using the created data as a parameter of a format complying with the GDI. As a result, the above-described output command is sent to the OS.

A printing data save driver 102 is an improvement of the above-mentioned device drivers, and is a software module provided to implement the document processing system. The printing data save driver 102 does not target a specific output device, and converts an output command into a format processible by a printing control application 104 or a printer driver 106 (to be described later). The format (to be referred to as a "page-storing file format" hereinafter) converted by the printing data save driver 102 is not particularly limited as far as the document structure and each original page can be expressed by a detailed format. As the format which expresses each original page, the PDF format by Adobe Systems and the SVG format can be adopted as page-storing files.

In the embodiment, a page-storing file 103 and editing information file 111 are processed as separate files, but when no file is opened, are combined as an archive file in order to hold the unity.

In the system shown in FIG. 1, data contents saved in the page-storing file 103 can be processed. This realizes a function not provided to an application which creates an original, such as a function of enlarging/reducing printing data from an application or a function of reducing a plurality of pages into one page and printing the page. For this purpose, the system in FIG. 1 is expanded from a conventional one so as to spool intermediate code data. Processing of printing data is generally set through a window provided by the printing control application 104, and the setting contents are saved in the RAM 202 or external memory 211.

As shown in FIG. 1, according to the extended processing method, printing data from the application 101 is saved as the page-storing file 103 in the system via the printing data save driver 102. The page-storing file 103 is also called an intermediate file, and contains content data of a print material, printing setting data, and the like. Content data of a print material is data prepared by converting data created in an application by the user into an intermediate code. Printing setting data is data which describes how to output content data (output form or the like). In addition, the page-storing file 103 contains application extension data called an editing information file for providing a user interface when the printing control application causes the user to edit the contents of a page-storing file or issue an output instruction.

The contents of the page-storing file 103, and particularly printing setting data are updated by the printing control application 104. The printing control application 104 can display printing settings such as the output form on the basis of the editing information file, cause the user to change printing settings, and save the changed settings. At this time, printing settings are also reflected in attribute data of the editing information file together with printing setting data of the page-storing file.

Printing processing is actually executed by the printing application (despooler) 105. The printing application (despooler) 105 which has received a printing command from the printing control application 104 inputs data to a graphic engine 121 in a predetermined format such as a GDI function in accordance with the output form set by the printing control application 104. The graphic engine 121 converts the input data of the GDI function format or the like into a DDI function, and outputs the DDI function to the printer driver 106. The printer driver 106 generates a printer control command of the page description language or the like on the basis of the DDI function acquired from the graphic engine 121, and outputs the command to the printer 107 via a system spooler 122.

<Example of Data Format of Permanent File>

Before a detailed description of the printing control application 104, the data format of the page-storing file will be described. The page-storing file contains data of each original page (data of each page generated by an application: to be also referred to as a logical page) as content data, and data of a job ticket format as printing setting data. An editing information file for changing setting of printing setting information contained in the page-storing file is also stored by the printing control application (to be described later) together with the page-storing file.

In the page-storing file, original page data is defined by the PDF format or the like, and contains designation of the character font and color, and layout information of characters, figures, and the like within an original page. In the page-storing file, original page data of the PDF format and data of the job ticket format are intermediate data.

The job ticket serving as a page-storing file is data having a structure whose minimum unit is an original page. The structure of the job ticket defines the layout of an original page on a paper sheet. The node of the whole document is set at the top of the structure, and defines the attribute of the whole document such as double-sided printing/single-sided printing. This node is accompanied with a document structure and information representing setting of each building component. More specifically, a sheet bundle node belongs to the document node, and contains attributes such as the identifier of paper for use and designation of a feed port in the printer. The node of a sheet contained in the sheet bundle belongs to each sheet bundle node. One sheet corresponds to one paper sheet. A printing page (physical page) belongs to each sheet. One physical page belongs to one sheet in single-sided printing, and two physical pages belong to one sheet in double-sided printing. An original page to be laid out on a physical page belongs to the physical page. The physical page attribute contains an original page layout. An original page contains association information (link information) to original page data which is the entity of the original page. Each node is given a setting value such as the print form.

Settings of the whole document include pieces of following information.

(1) Layout information (e.g., so-called N-up printing setting of laying out N pages on one physical page) and order of original pages on a physical page (sheet surface of a printing medium)

(2) Document name (3) Double-sided designation or not (4) Variable printing (technique of embedding separately prepared data in the contents of a predetermined column and printing the resultant data) or not (5) The number of contained original pages (6) Color type (7) The number of copies, etc.

(8) Watermark (ground pattern superposed on an original page or printing page)

(9) Printer state

(10) Medium type

(11) Logical page number list on a sheet

(12) Printing quality, etc.

As for printing settings of each sheet bundle, the following parameters can be set.

(13) Designation of N-up printing

(14) Color type

(15) Paper source

As for printing settings of each sheet belonging to each sheet bundle, the following parameter can be set.

(16) Setting of double-sided/single-sided printing

As for printing settings of each physical page (plane) belonging to each sheet, the following parameters can be set.

(17) Color type

(18) Designation of an upper or lower plane

As for printing settings of each original page laid out on each physical page, the following parameters can be set.

(19) Start coordinates

(20) Size

(21) Order

In this manner, the job ticket is data having a hierarchical structure whose minimum unit is an original page. Most of printing settings defined by the job ticket are common on each layer set for each document, but some printing settings such as N-up setting and color type are common between layers. In principle, as for a common setting, a lower layer inherits the same setting value as that of an upper layer. When an attribute common between layers has different values, a value set for a layer of interest is used as the value of the attribute. For example, the color type can be set for a whole document, sheet bundle (set of sheets), and physical page (to be also referred to as a plane or printing page). The color type is a setting which designates a mode in the printing apparatus. Printing data is generated such that, if the monochrome mode is set, the printing apparatus prints in monochrome; if the color mode is set, prints in color. Double-sided printing can be set for a whole document and sheet bundle.

Figure 12:
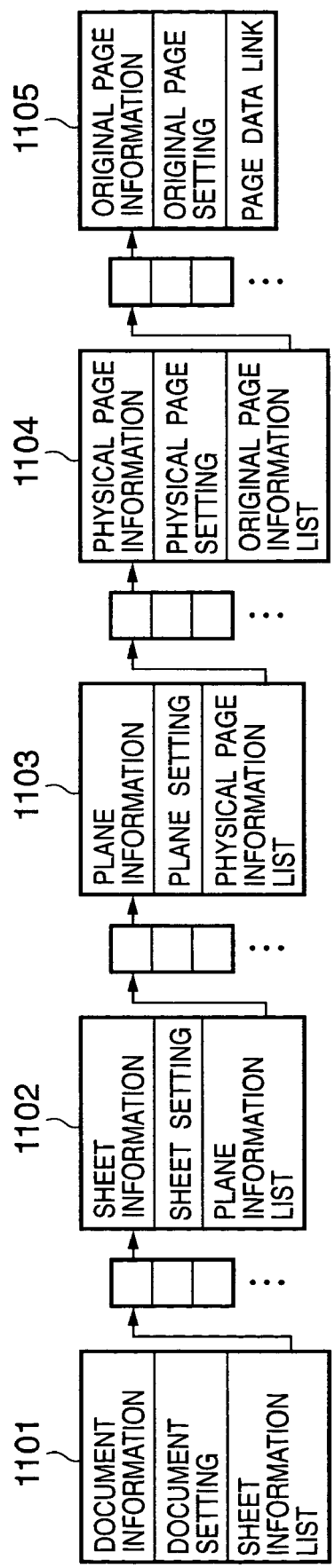
FIG. 12 is a view showing an example of a data structure used in printing or display.

FIG. 12 shows an example of the data structure of a job ticket. The structure in FIG. 12 is slightly different from the above-described structure in that no sheet bundle node exists, and a plane node is inserted instead immediately below a sheet node. In FIG. 12, a document to be printed is formed by a set of sheets, and each sheet is formed by two, upper and lower planes. Each plane has a region (physical page) for laying out an original, and each physical page is formed by a set of original pages serving as minimum units. Reference numeral 1101 denotes data corresponding to a document. The data 1101 is formed by data on a whole document and a list of sheet information constituting the document. Sheet information 1102 is formed by information on a sheet such as the sheet size, and a list of plane information laid out on the sheet. Plane information 1103 is formed by data unique to a plane, and a list of physical pages laid out on the plane. Physical page information 1104 is formed by information such as the size and header/footer of a physical page, and a list of original pages which form the physical page. The document information 1101, the sheet information 1102, the plane information 1103, the physical page information 1104, and original page information 1105 contain the above-described parameters.

<Document Structure Managed by Editing Information File>

The printing control application 104 is a program which provides a user interface for causing the user to designate data contained in a page-storing file by various methods and change printing settings. The page-storing file is a file having the above-described structure. The printing control application 104 manages the above-mentioned editing information file in correspondence with the page-storing file in order to manage the page-storing file. Based on editing information contained in the editing information file, the printing control application 104 manages a document with a management structure independent of a document defined by the page-storing file, e.g., a job ticket. The management structure is a hierarchical structure similar to the job ticket, but is formed by layers "book", "chapter", and "original (logical) page" from the top, unlike the job ticket. Of these layers, the original page corresponds to the original page of the job ticket. The chapter corresponds to the sheet bundle (set of sheets).

A virtual file displayed as a user interface is not a file which is permanently saved and managed, unlike the page-storing file 103, but is temporarily created for a user interface when the user changes the printing settings of the page-storing file or designates printing by using the printing control application 104. The printing control application 104 opens the page-storing file 103 together with a corresponding editing information file 111, creates a virtual book file having a structure defined by editing information from the page-storing file, and displays the book file as a user interface. When the user changes printing settings while referring to the book file via the user interface, the settings are reflected in the editing information file.

<Example of Format of Editing Information File>

Before referring to details of the printing control application 104, the data format of a book file, i.e., editing information file will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may contain a plurality of chapters, and one chapter may contain a plurality of pages.

Figure 3:
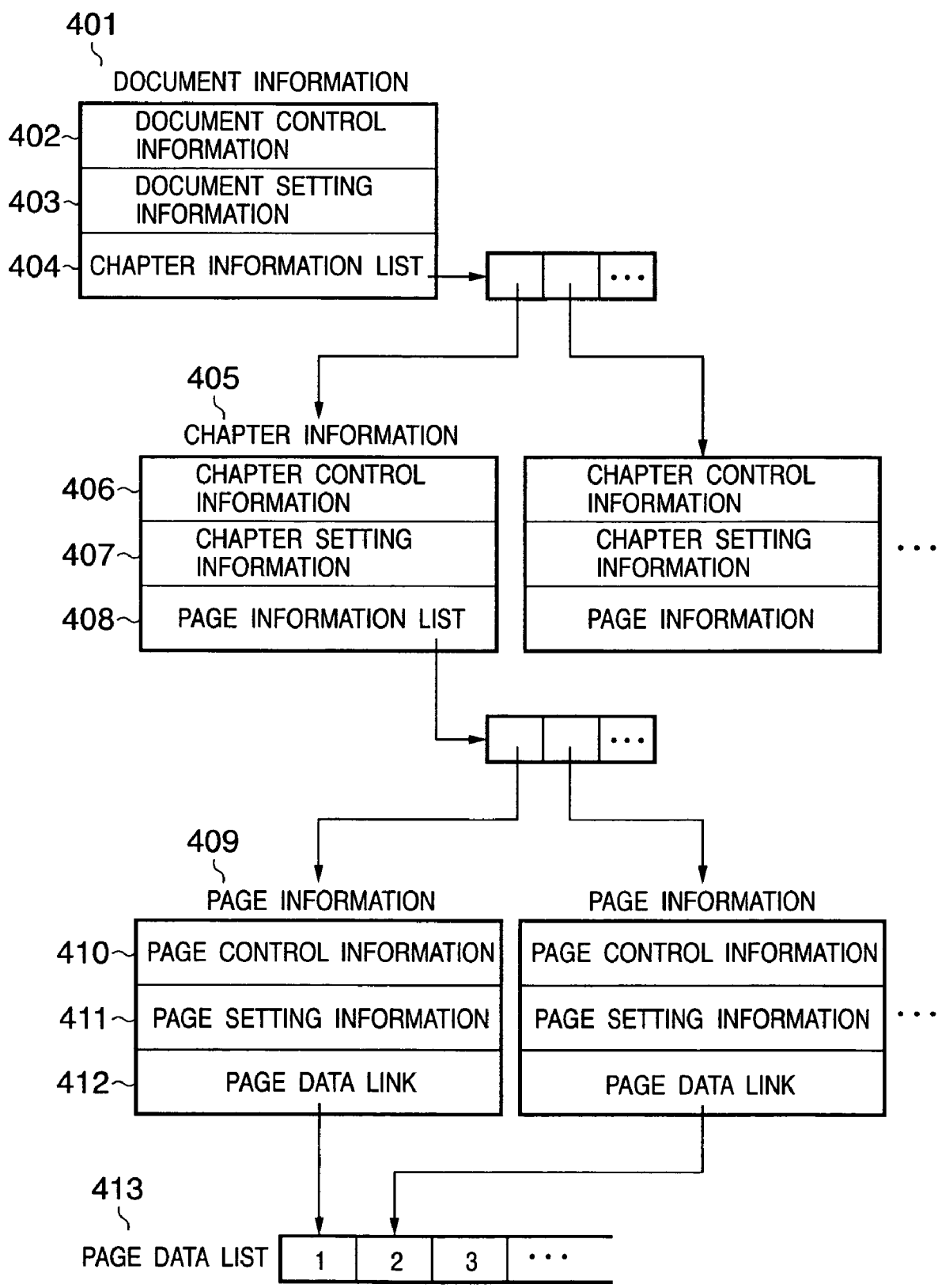
FIG. 3 is a view showing an example of a book file structure.

FIG. 3 is a block diagram schematically showing an example of the book file format. A book, chapter, and page in the book file of this example are represented by corresponding nodes. One book file contains one book. The book and chapter are a concept for defining a book structure, and contain, as entities, defined attribute values and links to lower layers. The page entity is original page data of the PDF format or the like which is contained in the page-storing file 103. That is, the editing information file only defines the book file format and attributes, and does not contain original page data itself. The page has, as entities, data of each page output from an application program. The page contains an original page entity (original page data) and a link to each original page data in addition to an attribute value. Note that a printing page to be output to a paper medium may contain a plurality of original pages. This structure is displayed not by a link, but by attributes in book, chapter, and page layers.

In FIG. 3, a book file need not be one completed book, and "book" is generalized as "document". Information on a document, information on a chapter, and information on a page will be comprehensively called document information, chapter information, and page information, respectively.

In FIG. 3, document information 401 is defined at the top. The document information 401 can be roughly divided into document control information 402, document setting information 403, and a chapter information list 404. The document control information 402 holds information such as the path name in the file system of a document file. The document setting information 403 holds layout information such as the page layout, and function setting information of a printing apparatus such as stapling, and corresponds to book attributes. The chapter information list 404 holds as a list a set of chapters which form a document. The list holds chapter information 405.

The chapter information 405 can also be roughly divided into chapter control information 406, chapter setting information 407, and a page information list 408. The chapter control information 406 holds information such as the chapter name. The chapter setting information 407 holds information on the page layout and stapling unique to the chapter, and corresponds to chapter attributes. By holding setting information for each chapter, a document having a complicated layout can be created such that the first chapter has a 2-up layout (layout of laying out two pages in one plane) and the remaining chapters have a 4-up layout (layout of laying out four pages in one plane). The page information list 408 holds as a list a set of original pages which form each chapter. The page information list 408 designates page information data 409.

The page information data 409 can also be roughly divided into page control information 410, page setting information 411, and page link information 412. The page control information 410 holds information such as a page number displayed at the tree. The page setting information 411 holds information such as the page rotation angle and page layout position information, and corresponds to original page attributes. The page link information 412 is original data corresponding to a page. In this example, the page information 409 does not directly have original data, but has only the link information 412. Actual original data is held by a page data list 413.

FIGS. 4A and 4B show a list representing an example of book attributes (document setting information 403). In general, as for an item which can be defined repetitively on a lower layer, the attribute value of the lower layer is preferentially adopted. As for an item contained in only the book attribute, a value defined in the book attribute is effective over the book. An item repetitively defined on a lower layer is a default value used when this item is not defined in the lower layer. In this example, however, whether to preferentially adopt the attribute value of a lower layer can be selected, which will be described later. Each item shown in FIGS. 4A and 4B does not correspond to one concrete item, but may contain a plurality of relevant items.

Items unique to book attributes are six items: printing method, details of bookbinding, front/back cover, index sheet, slip sheet, and chaptering. These items are defined over the book. As printing method attributes, three values: single-sided printing, double-sided printing, and bookbinding printing can be designated. Bookbinding printing is a method of printing data in a format which allows bookbinding by bundling a separately designated number of paper sheets, folding the bundle into two, and binding the bundle. As detailed bookbinding attributes, the opening direction and the number of paper sheets to be bundled can be designated when bookbinding printing is designated.

The front/back cover attribute includes designation of adding paper sheets serving as front and back covers when a page-storing file combined as a book is printed, and designation of contents to be printed on the added paper sheets. The index sheet attribute includes designation of inserting a tabbed index sheet separately prepared in a printing apparatus for chaptering, and designation of contents to be printed on the index (tabbed) portion. This attribute becomes effective when a printing apparatus to be used is equipped with an inserter having an inserting function of inserting a paper sheet prepared separately from a printing sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new printing page, or do nothing particular at a chapter break. In single-sided printing, the use of a new paper sheet and the use of a new printing page are the same. In double-sided printing, a continuous chapter is not printed on one paper sheet if "the use of a new paper sheet" is designated, but may be printed on the obverse and reverse of one paper sheet if "the use of a new printing page" is designated.

FIG. 5 shows a list representing an example of chapter attributes (chapter setting information 407), and FIG. 6 shows a list representing an example of page attributes (page setting information 411). The relationship between chapter attributes and page attributes is the same as that between book attributes and lower layer attributes.

As for the chapter attribute, there is no item unique to the chapter, and all items overlap those of the book attribute. In general, if the definition of the chapter attribute is different from that of the book attribute, a value defined by the chapter attribute precedes. In this example, however, whether to preferentially adopt the attribute value of a lower layer can be selected, which will be described later.

Items common to only the book and chapter attributes are five items: paper size, paper direction, N-up printing designation, enlargement/reduction, and delivery method. The N-up printing designation attribute is an item for designating the number of original pages contained in one printing page. Layouts which can be designated are 1×1, 1×2, 2×2, 3×3, 4×4, and the like. The delivery method attribute is an item for designating whether to staple discharged paper sheets. The effectiveness of this attribute depends on whether the printing apparatus has a stapling function.

Items unique to the page attribute are a page rotation attribute, zoom, layout designation, annotation, and page separation. The page rotation attribute is an item for designating the rotation angle when an original page is laid out on a printing page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one printing page for 1×1, and a region obtained by reducing each side of one printing page to about 70% for 1×2.

Attributes common to the book, chapter, and page are a watermark attribute and header/footer attribute. The watermark is a separately designated image or character string printed over data created by an application. The header and footer are watermarks printed at the upper and lower margins of each page. For the header and footer, items such as a page number, and time and date which can be designated by variables are prepared. Contents which can be designated by the watermark attribute and header/footer attribute are common to the chapter and page, but are different from those of the book. The book can set the contents of the watermark and header/footer, and designate how to print a watermark or header/footer throughout the book. To the contrary, the chapter and page can designate whether to print a watermark or header/footer set by the book on the chapter or page.

<Example of Operation Sequence of Document Processing System According to Embodiment>

Figure 7:
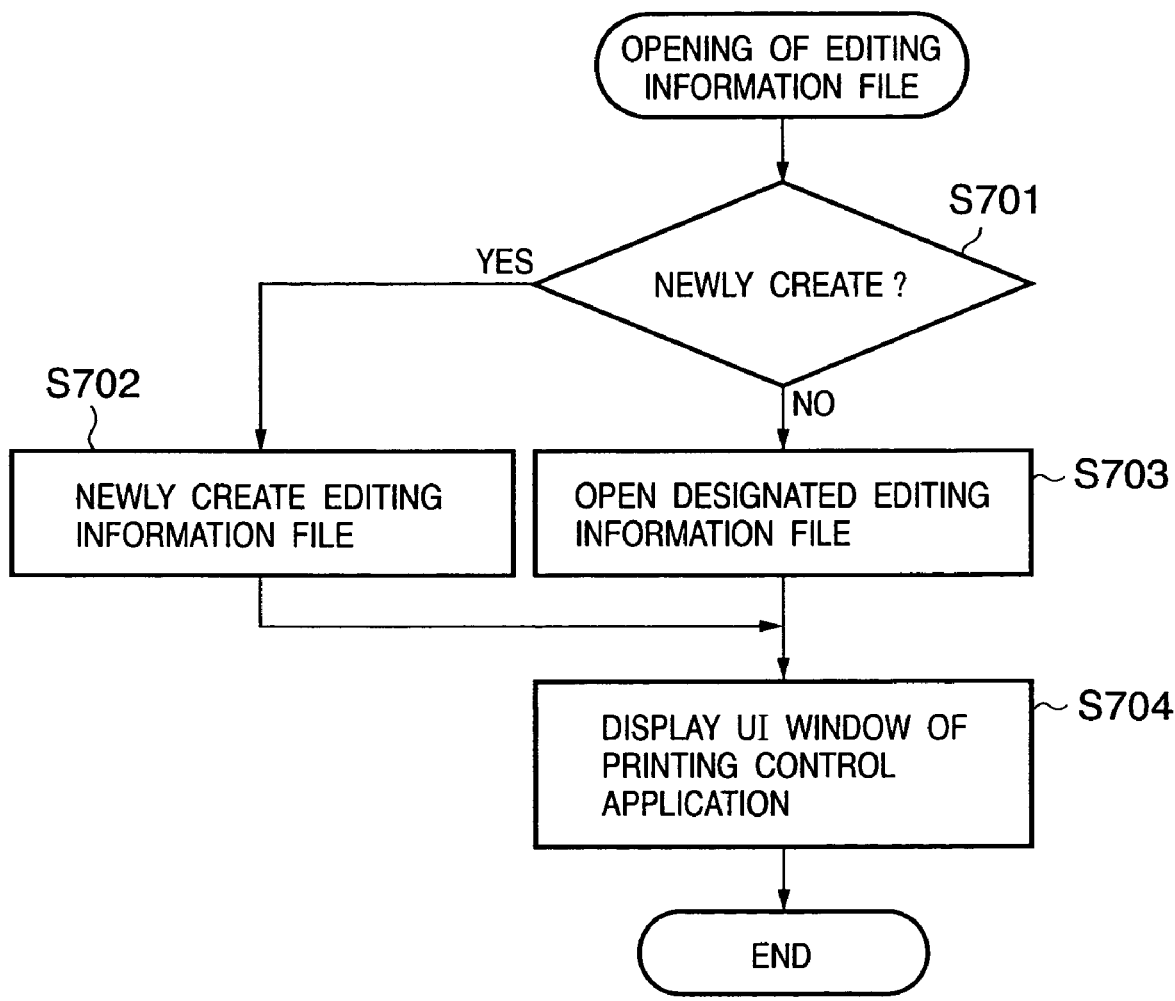
FIG. 7 is a flow chart showing an example of a sequence of opening a book file.

The editing information file has the above-described structure and contents. A sequence of creating the editing information file 111 and page-storing file 103 by the printing control application 104 and printing data save driver 102 will be explained. Creation of the editing information file 111 is realized as part of editing operation of the editing information file 111 by the printing control application 104. FIG. 7 shows a sequence when the printing control application 104 opens the editing information file 111.

Figure 8:
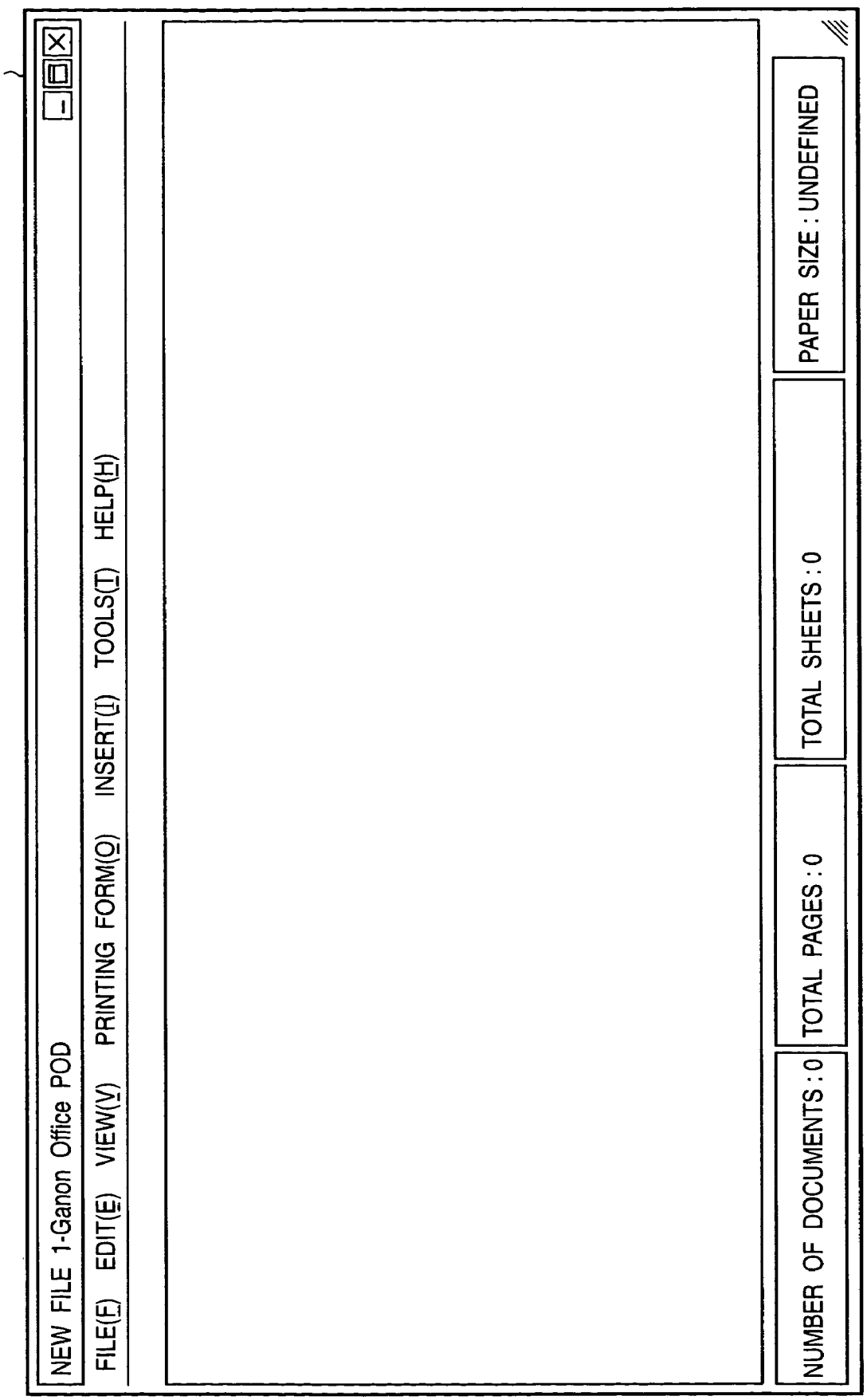
FIG. 8 is a view showing an example of a user interface window when a new book file is opened.

Whether an editing information file to be opened is one to be newly created or an existing one is determined (step S701). If YES in step S701, an editing information file containing no chapter is newly created (step S702). In the example shown in FIG. 3, the newly created editing information file is a book node having no chapter node linked to the chapter information list 404. As the book attribute, a set of attributes prepared in advance for creation of a new editing information file are applied. A UI (User Interface) window for editing the new editing information file is displayed (step S704). FIG. 8 shows an example of a UI window when a book file is newly created. In this case, the book file does not have any substantial content, and a UI window 800 does not display anything.

Figure 9:
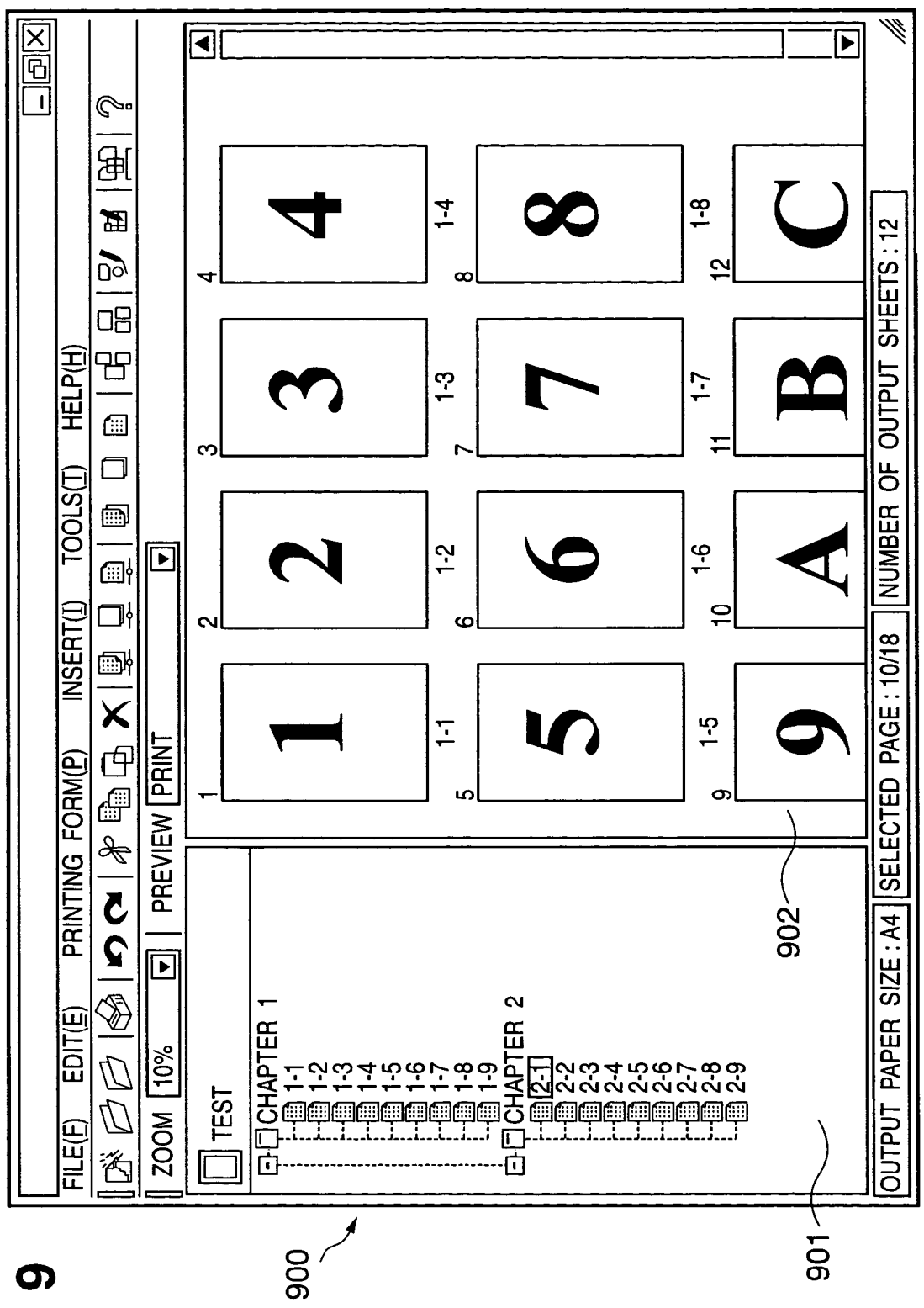
FIG. 9 is a view showing an example of a user interface window when an existing book file is opened.

If NO in step S701, a designated editing information file is opened (step S704), and data are rasterized in accordance with the structure, attributes, and contents of the editing information file to display a UI (User Interface) window. FIG. 9 shows an example of the UI window. A UI window 900 has a tree portion 901 representing a book structure, and a preview portion 902 displaying a state to be printed. The tree portion 901 displays chapters contained in the book and pages contained in each chapter by a tree structure so as to exhibit a tree structure as shown in FIG. 3. Pages displayed at the tree portion 901 are original pages. The preview portion 902 displays reduced printing page contents. The display order reflects the book structure. Data mapped in the RAM 102 also takes the same structure as that in FIG. 3. Attributes contained in the node of each layer are also mapped in the RAM 102 in the format shown in FIGS. 4A to 6. For example, the structure of these attribute items can be realized with a pointer or the like, and each item at the attribute can be identified by the identifier of the item or the like.

Figure 10:
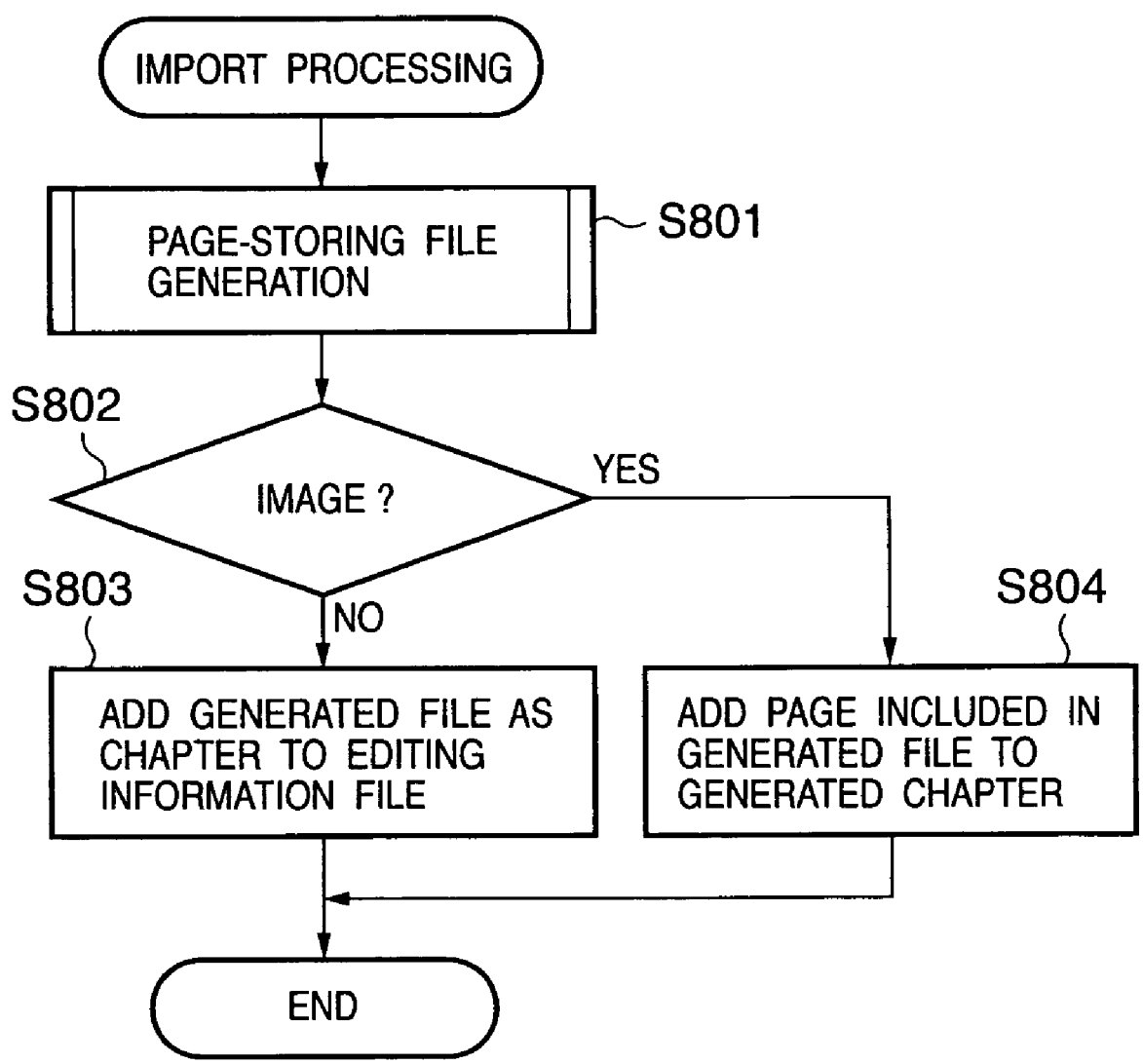
FIG. 10 is a flow chart showing an example of a sequence of importing an electronic original file to a book file.

Original page data can be added as a new chapter to the open editing information file by the printing data save driver 102. This function is called an import function. Application data is imported to the editing information file newly created by the sequence of FIG. 7, and the original page data is made to belong to the chapter of the editing information file, thereby giving an entity to the editing information file. This function is activated by drag-and-drop operation of application data to the window of FIG. 8. FIG. 10 shows an import processing sequence.

In FIG. 10, an application program which has generated designated application data is activated. The printing data save driver 102 is designated as a device driver, and application data is printed out to convert the data into data of an intermediate format (e.g., PDF format) (step S801). After conversion, whether the converted data is image data is determined (step S802). This determination can be done on the basis of the file extension of application data under the Windows® OS. For example, an extension "bmp" represents Window® bitmap data; "jpg", jpeg-compressed image data; and "tiff", tiff-format image data.

If NO in step S802, the intermediate data generated in step S801 is added as a new chapter to the book of a currently open editing information file (step S803). That is, a new chapter and new original pages belonging to this chapter are added by import. Link information to the entity of an original page is written at each page node. The entity of the original page is generated by the printing data save driver 102.

In import, as for chapter attributes which are common to book attributes, the values of the book attributes are copied. As for unique chapter attributes, predetermined default values are set.

If YES in step S802, no new chapter is added in principle, and image data is added to a designated chapter by using one file as one original page (step S804). For an empty file in which an editing information file is newly created, a new chapter is created, and image data is added as an original page belonging to the chapter. As for the page attribute, attributes common to the attributes of an upper layer are given the attribute values of the upper layer, and attributes which are defined in application data and inherited to the page-storing file are given values defined in the application data. For example, when N-up designation (designation of laying out N pages in one plane) is defined in application data, the page inherits this attribute value. In this way, a new editing information file is created, or a new chapter is added.

As for a page-storing file, added original page data is newly added and saved if data generated by the printing data save driver is an addition to an existing page-storing file. At this time, if printing settings designated by an application are reflected in data generated by the printing data save driver, the printing settings can also be reflected in the page-storing file.

Figure 11:
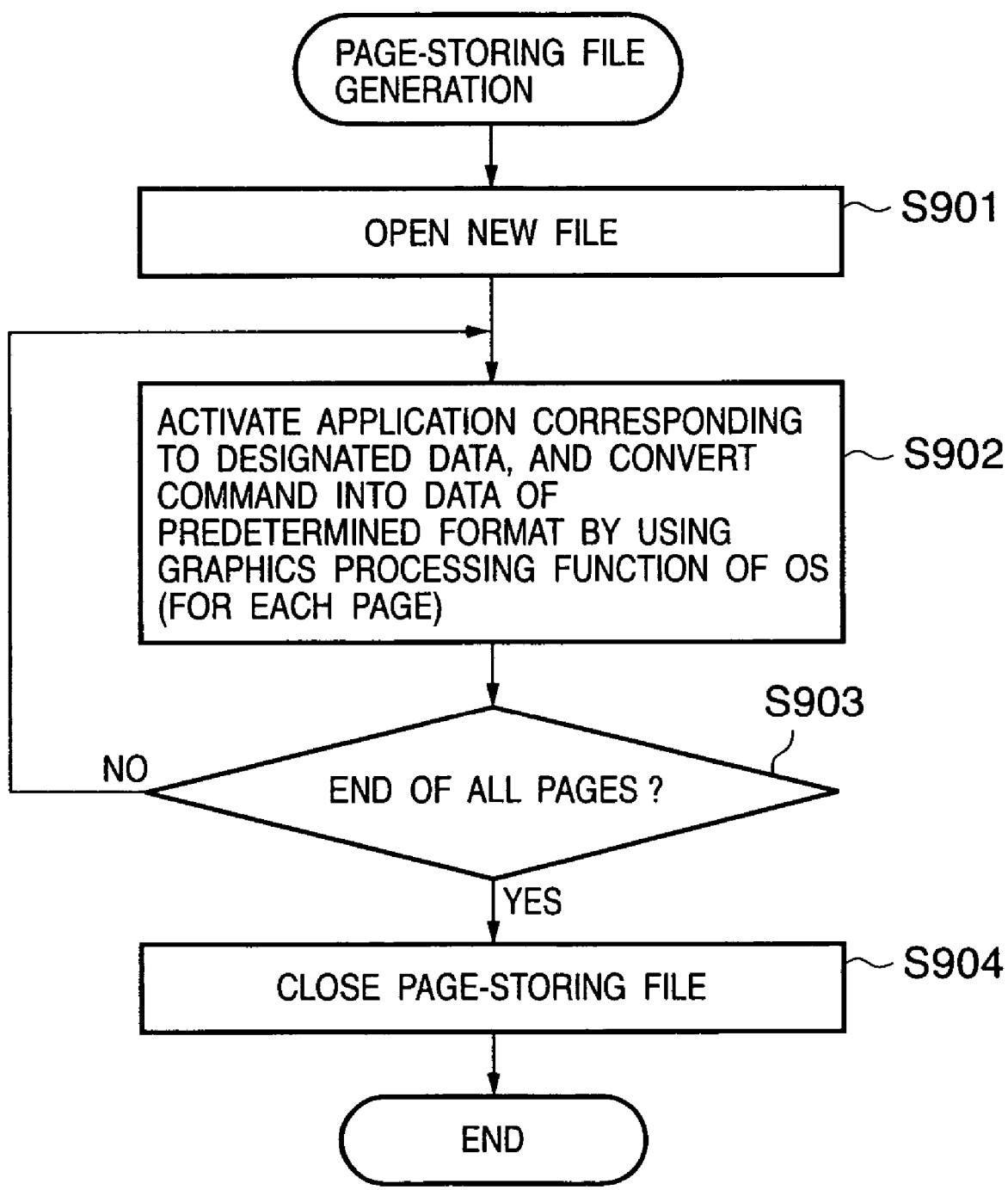
FIG. 11 is a flow chart showing an example of a sequence of converting application data in step 801 of FIG. 10 into an electronic original file.

FIG. 11 is a flow chart showing a sequence of generating a page-storing file by the printing data save driver 102 in step S801 of FIG. 10. A new page-storing file is created and opened (step S901). An application corresponding to designated application data is activated. The printing data save driver 102 is set as a device driver to transmit an output command to an OS output module (e.g., Windows® GDI). The output module converts the received output command into data of a predetermined format (e.g., PDF format) by the printing data save driver 102, and outputs the converted data (step S902). The output destination is the page-storing file opened in step S901. Whether all designated data have been converted is determined (step S903), and if YES in step S903, the page-storing file is closed (step S904). The page-storing file generated by the printing data save driver 102 is a file which contains a structure shown in FIG. 12 and original page data entities.

<Editing of Permanent File and Editing Information File>

In the above fashion, the editing information file 111 and page-storing file 103 can be created from application data. As for the generated page-storing file 103, chapters and pages defined by the editing information file 111 can be edited as follows.

(1) New document (2) Delete (3) Copy (4) Cut (5) Paste (6) Move (7) Change chapter name (8) Reassign page number/name (9) Insert cover

(10) Insert slip sheet

(11) Insert index sheet

(12) Page layout of each original page

(13) Chapter separation

In addition, an operation of canceling executed editing operation, and an operation of restoring canceled operation can be performed. These editing functions enable editing operations such as consolidation of a plurality of editing information files, rearrangement of chapters and pages within an editing information file, delete of chapters and pages within an editing information file, layout change of an original page, insertion of a slip sheet and index sheet, and chapter separation (to be described later). By these operations, operation results are reflected in attributes shown in FIGS. 4 to 6 or on an editing information file structure. For example, a blank page is inserted to a designated portion by an operation of newly adding a blank page. The blank page is processed as an original page. If the layout of an original page is changed, the change contents are reflected in attributes such as the printing method, N-up printing, front/back cover, index sheet, slip sheet, and chaptering.

These editing contents are also reflected in the page-storing file. For example, if double-sided printing is set as a printing method for a whole document, the setting is reflected as the book attribute of the editing information file and also as setting data of the whole document in printing setting data of the page-storing file. If an operation of moving, deleting, or separating a chapter is performed, not only attributes are changed, but also a document structure in the page-storing file, for example, when the above-mentioned job ticket is saved in the page-storing file, the job ticket structure is changed by reflecting the operation contents. That is, if a chapter is deleted, nodes corresponding to the deleted chapter and page, for example, a sheet bundle node for the chapter and a node belonging to this node are deleted from the job ticket. If a chapter is inserted, a sheet bundle node corresponding to the chapter is newly added.

<Output of Permanent File>

The ultimate goal of an editing information file created and edited in the above manner is to print it out. If the user selects a file menu from the UI window 900 of the printing control application shown in FIG. 9 and selects printing from this menu, the editing information file is then printed out by a designated output device. At this time, the printing control application 104 creates data called a despool table from a currently open editing information file and corresponding page-storing file (e.g., job ticket), and transfers the despool table to the printing application 105.

The despool table contains the same structure as that of the original job ticket, printing settings in respective layers, and association with original pages. More specifically, printing settings such as the number of copies, color type, and double-sided/single-sided printing designation which are effective for a whole document are accompanied by printing settings such as N-up printing designation which are effective for a sheet bundle (set of sheets). Each sheet belonging to each sheet bundle has printing settings such as double-sided/single-sided printing. Each physical page (plane) belonging to each sheet has printing settings such as the color type and designation of an upper/lower plane. The printing settings of each layer include settable items. Settings in the despool table are designated on physical pages in accordance with the device specifications. The printing application 105 converts the despool table into a parameter to be transferred to the graphic engine 121.

The printing application 105 converts the page-storing file 103 into an OS output command, e.g., a Windows® GDI command, and calls a GDI function serving as a graphic engine by using the command as a parameter. The graphic engine 121 generates a command complying with a device (e.g., printer) by the designated printer driver 121, and transmits the command to the device.

The graphic engine 121 loads the printer driver 106 prepared for each printing device from the external memory 211 to the RAM 202, and sets the output to the printer driver 106. The graphic engine 121 converts a GDI (Graphic Device Interface) function into a DDI (Device Driver Interface) function, and calls a DDI function provided by the printer driver 106. The printer driver 106 converts the command into a control command such as a PDL (Page Description Language) command recognizable by the printer on the basis of the DDI function called from the output module. The converted printer control command passes through the system spooler 122 loaded by the OS to the RAM 202, and is output as printing data to the printer 107 via the interface 21

(Example of Preview Display Contents)

As described above, when a book file is opened by the printing control application, the user interface window 900 shown in FIG. 9 is displayed. The tree portion 901 displays a tree representing the structure of the open book (to be referred to as a "book of interest" hereinafter). At the preview portion, three display methods are prepared in accordance with designation by the user. The first method is a mode called an original view which directly displays original pages. In the original view mode, the contents of original pages belonging to the book of interest are reduced and displayed. The display of the preview portion does not reflect any layout. The second method is a printing view mode. In the printing view mode, the preview portion 902 displays original pages in a format which reflects the layout of them. The third method is a simple printing view mode. In the simple printing view mode, the contents of original pages are not reflected in the display of the preview portion, but only the layout is reflected.

<Another Example of Configuration of Document Processing System>

The document processing system according to the embodiment is of a stand-alone type. A server-client system as an extension of the stand-alone system also creates and edits a book file by almost the same configuration and sequence. A book file and printing processing are managed by the server.

Figure 13:
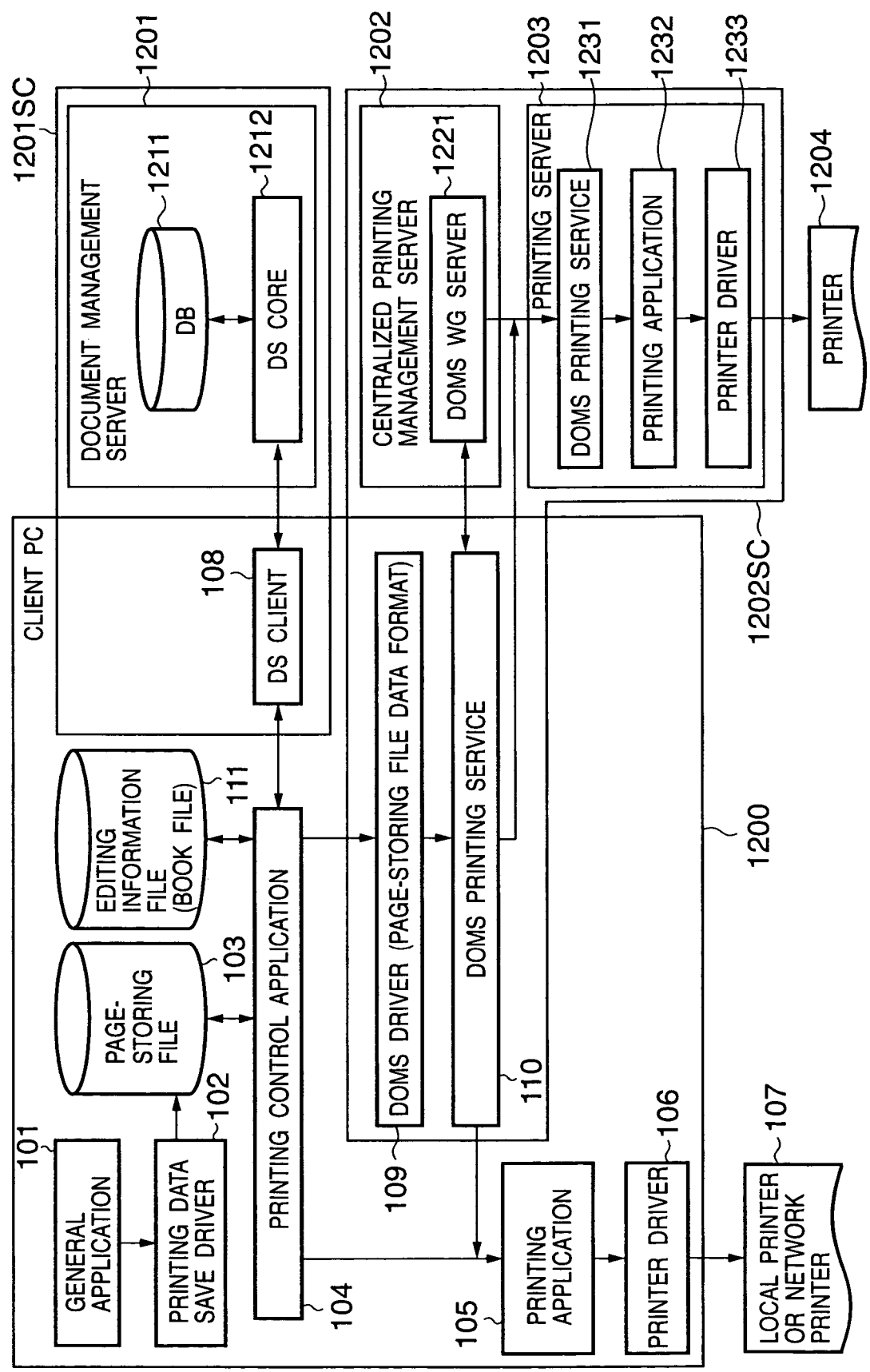
FIG. 13 is a block diagram showing an example of the software configuration of a client-server document processing system.

FIG. 13 is a block diagram showing the configuration of a server-client document processing system.

The client document processing system is constituted by adding to the stand-alone system a DOMS (Document Output Management Service) driver 109 serving as a client module, a DOMS printing service module 110, and a DS (Document Service) client module 108. A client document processing system 1200 is connected to a document management server 1201, centralized printing management server 1202, and printing server 1203. These servers are generally connected to the client document processing system via a network. When the servers also function as clients, they are connected by interprocess communication which simulates communication between networks. The document management server 1201 and centralized printing management server 1202 are connected to the client in FIG. 13, but only either one may exist on the network. If the connected server is the document management server, a document management server-client system 1201SC including a client module is added to the stand-alone document management system. If the connected server is the centralized printing management server 1202, a printing management server-client system 1202SC including a client module is added.

The document management server 1201 stores a book file created and edited by the printing control application 104. To manage a book file by the document management server 1201, the book file is saved in a database 1211 of the document management server 1201 instead of or in addition to the local HD of a client PC. Save and read of a book file between the printing control application 104 and the document management server 1201 are done via the DS client module 108 and a DS core 1212.

The centralized printing management server 1202 manages printing of a book file stored in the client document processing system 1200 or document management server 1201. A printing request from the client is transmitted to a DOMS WG server module 1221 of the centralized printing management server 1202 via the DOMS driver 109 and DOMS printing service module 110. To print a book file by the printer of the client, the centralized printing management server 1202 transfers electronic original data to the printing application 105 via the DOMS printing service module 110 of the client. To print a book file by the printing server 1203, the centralized printing management server 1202 transmits electronic original data to a DOMS printing service module 1231 of the printing server 1203. For example, the centralized printing management server executes security check on the qualification of a user who has issued a printing request for a saved book file, or saves the printing processing log. In this fashion, the document processing system can be implemented as both a stand-alone system and client-server system.

[Example of Editing Operation of Document Processing System According to Embodiment]

FIG. 9 shows the operation window of the printing control application 104. The printing control application can set the function of a printing apparatus such as stapling, in addition to editing such as a change of the page order of a document, copying, delete, and chapter separation. The printing control application can cause a designated printing apparatus to print. A tree view representing a document structure is displayed in the left region of FIG. 9. A document is formed by a set of chapters, and each chapter is formed by a set of original pages. The printing preview of each page is displayed in the right region of FIG. 9.

<Example of Attribute Setting of Document Processing System According to Embodiment>

Figure 14:
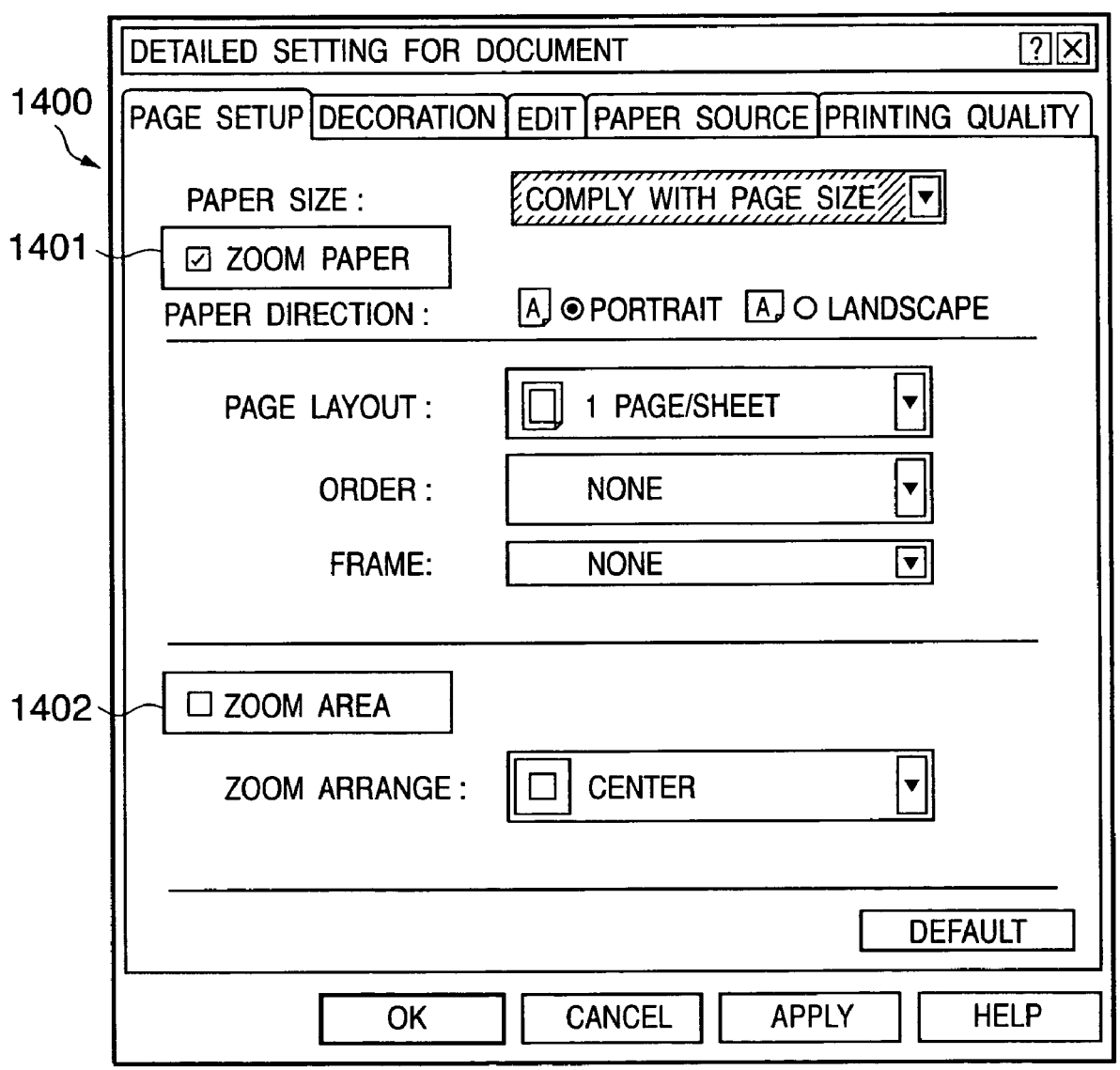
FIG. 14 is a view showing an example of a dialog window for setting a whole document serving as the uppermost layer of a data structure.

FIG. 14 shows a "detailed setting for document" window 1400 of the printing control application 104.

This window allows displaying/setting the "document setting information 403". This window is activated from the "detailed setting for document" item of a "print form" menu in the application operation window of FIG. 9 or a "detailed setting for document" button on the tool bar. The "detailed setting for document" window 1400 is a window for setting attributes which influence a whole document, i.e., book attributes shown in FIGS. 4A and 4B. This window is formed by five sheets "page setup", "decoration", "edit", "paper source", and "printing quality". FIG. 14 shows a state in which the "page setup" sheet is displayed. In the "page setup" sheet, settings mainly concerning the layout can be done. Settings such as the paper size, direction, and N-page printing can be designated. This window has check box controls 1401 and 1402 for the zoom.

Figure 15:
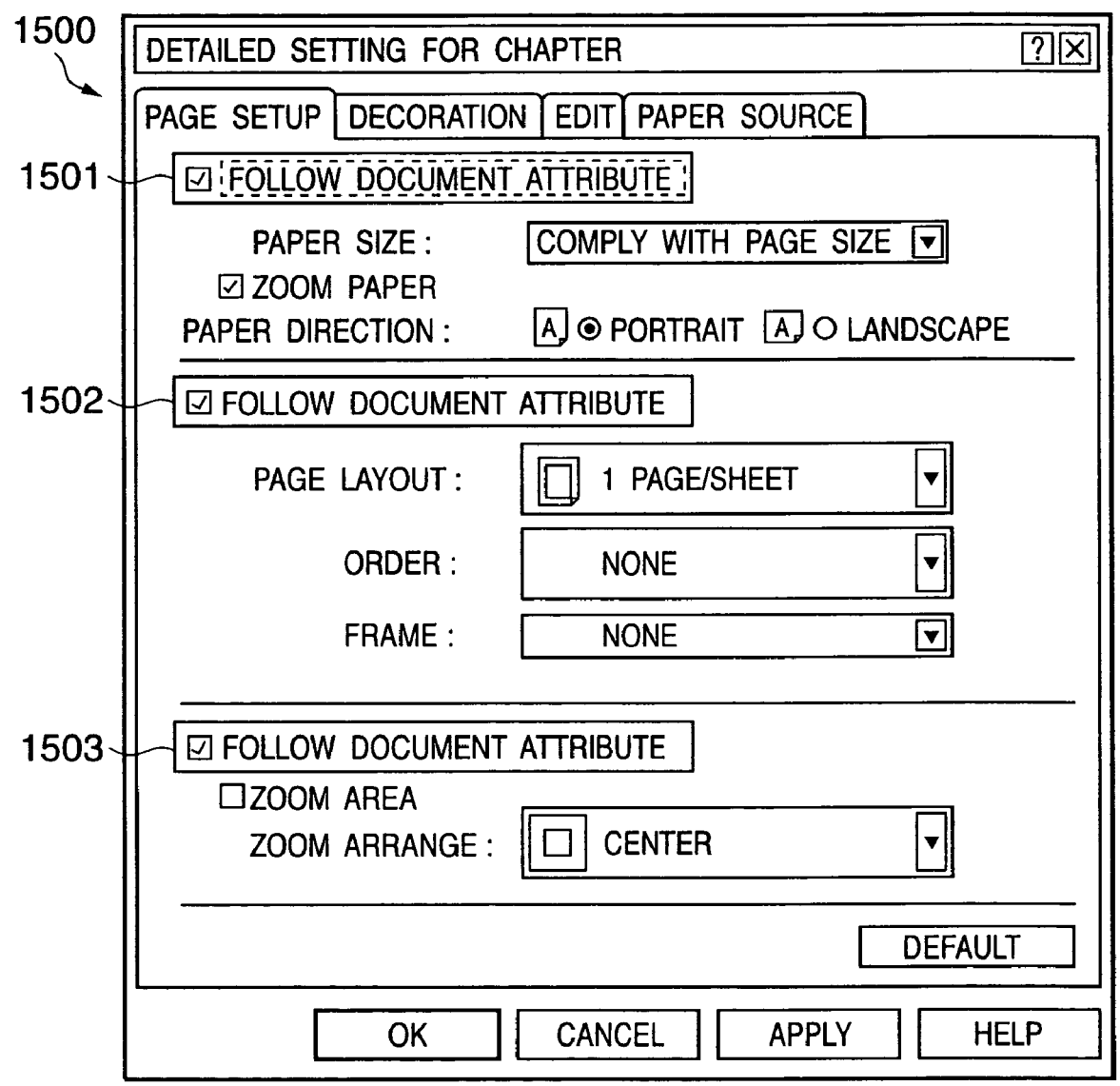
FIG. 15 is a view showing an example of a dialog window for setting a chapter serving as the intermediate layer of the data structure.

FIG. 15 shows a "detailed setting for chapter" window 1500 of the printing control application 104.

Figure 16:
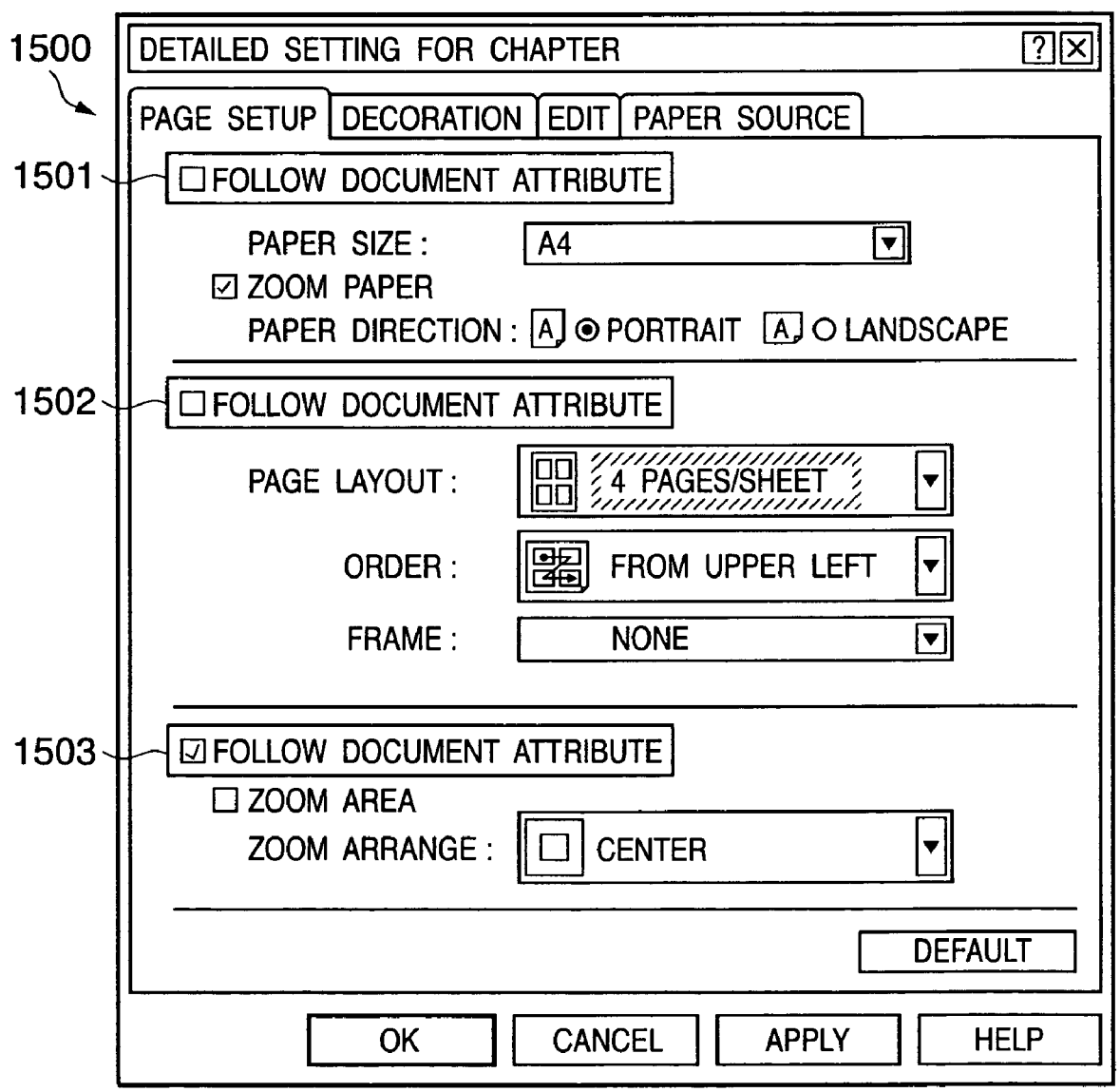
FIG. 16 is a view showing an example of setting a unique attribute in the dialog window of FIG. 15.

This window allows displaying/setting the "chapter setting information 407". This window is activated from the "detailed setting for chapter" menu of a printing setting menu in the application operation window of FIG. 9 or a "detailed setting for chapter" button on the tool bar. The "detailed setting for chapter" window is a window for setting attributes unique to a chapter. This window is formed by four sheets "page setup", "decoration", "edit", and "paper source". FIG. 15 shows a state in which the page setup sheet is displayed. In the page setup sheet, settings mainly concerning a layout unique to each chapter can be done. Settings such as the paper size, direction, and N-page printing can be designated. "Follow book attribute" check box controls 1501, 1502, and 1503 are arranged for repetitive setting items between "detailed setting for document" and "detailed setting for chapter". For an item group whose check box is checked, the setting values of the document are applied to the chapter. FIG. 16 shows a case wherein the check box is not checked. Settings unique to a chapter can be classified into two types: setting items held by only a chapter, and setting items whose setting values different from those of the document in the upper layer are held in the chapter layer.

FIG. 16 shows a state in which the check box controls 1501 and 1502 of "detailed setting for chapter" in FIG. 15 are not checked. In this case, even if the whole document uses A3 paper, pages which constitute this chapter use A4 paper. As for the layout, even if the document designates one page/sheet, the chapter designates a layout of four pages/sheet. "Zoom arrange" is checked, and the setting values of the document in the upper layer are employed as those of the chapter.

Figure 17:
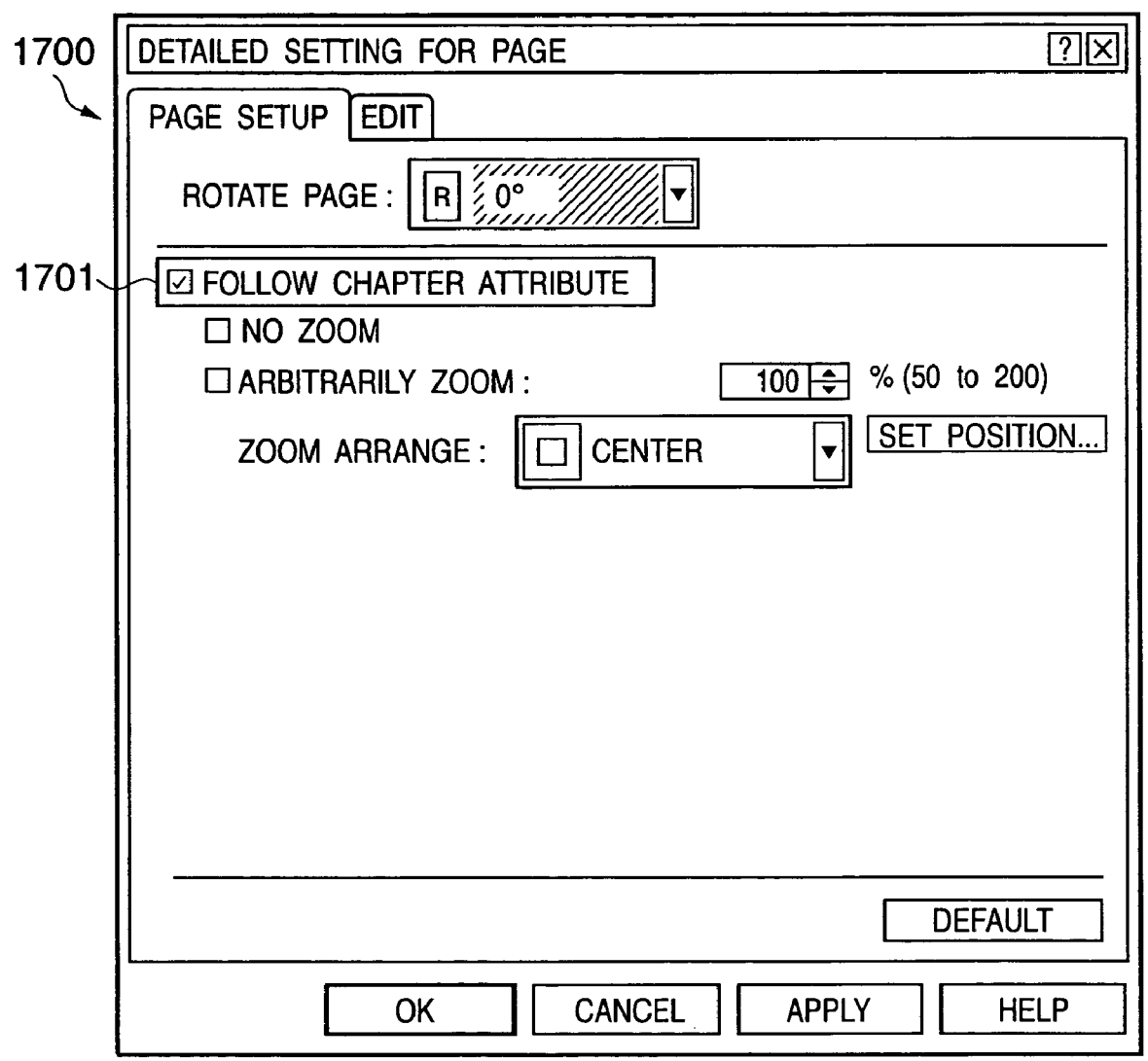
FIG. 17 is a view showing an example of a dialog window for setting a page serving as the lowermost layer of the data structure.

FIG. 17 shows a "detailed setting for page" window 1700 of the printing control application 104.

Figure 18:
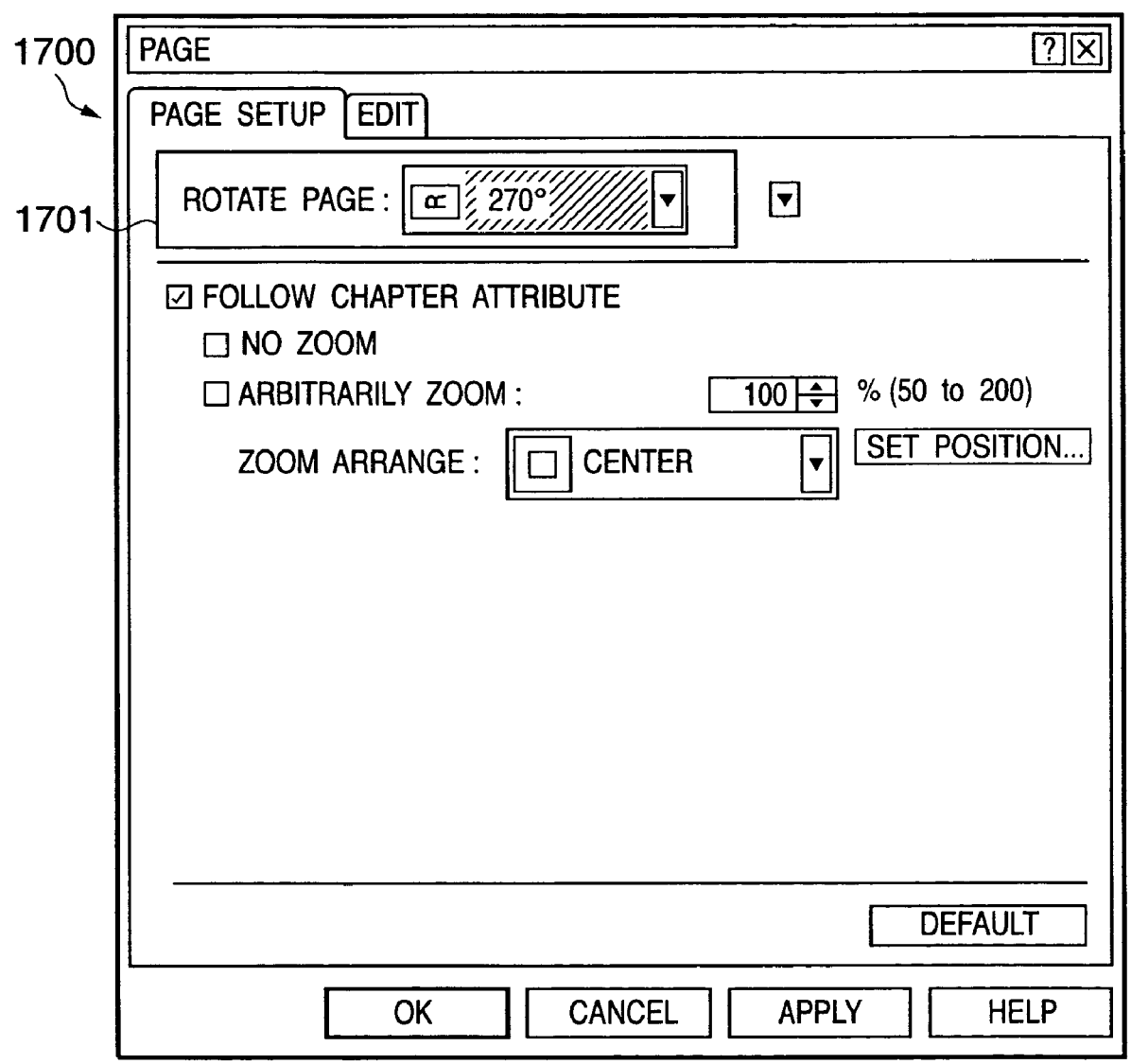
FIG. 18 is a view showing an example of changing a setting value in the dialog window of FIG. 17.

This window allows displaying/setting the "page setting information 411". This window is activated from the "detailed setting for page" menu of the print form menu in the application operation window of FIG. 9 or a "detailed setting for page" button on the tool bar. The "detailed setting for page" window is a window for setting attributes unique to each page. This window is formed by two sheets "page setup" and "edit". FIG. 17 shows a state in which the page setup sheet is displayed. In the page setup sheet, settings mainly concerning a layout unique to each page can be done, and settings such as the rotation angle and enlargement/reduction ratio in laying out an original page can be designated. A "follow chapter attribute" check box control 1701 is arranged for repetitive setting items between "detailed setting for chapter" and "detailed setting for page". For an item whose check box is checked, the setting value of the chapter is applied to the page. FIG. 18 shows a case wherein the check box is not checked.

FIG. 18 shows a state in which "page rotation" setting is changed in "detailed setting for page" of FIG. 17. The control 1701 exhibits a setting of rotating and arranging an original page with the upper portion of the page oriented left in laying out the original page. This item is not a repetitive setting item in the chapter and document, no "follow chapter attribute" check box exists, and the setting displayed in this window is always adopted as the setting value of the page. When the control 1701 is set, the "zoom arrange" item is a repetitive setting item in the chapter, and the setting value of the chapter is used as that of the page.

The "zoom arrange" item is a repetitive setting item in the document. When the "follow document attribute" 1503 is checked in the "zoom arrange" item of the chapter, the setting value of the document in the upper layer is used as that of the chapter, and thus the setting value of the document is used as that of the page. When the "zoom arrange" item is not checked in the chapter, the chapter has a unique setting value, and the setting value unique to the chapter is used as the setting value of the page.

Check box control information set in the setting window may be held in a dedicated region, but is desirably held as one attribute in the setting information shown in FIG. 3. In this case, regions for holding check box control information are added to the lists of FIGS. 5 and 6.

<Example of Document Editing Display of Document Processing System According to Embodiment>

Figure 19:
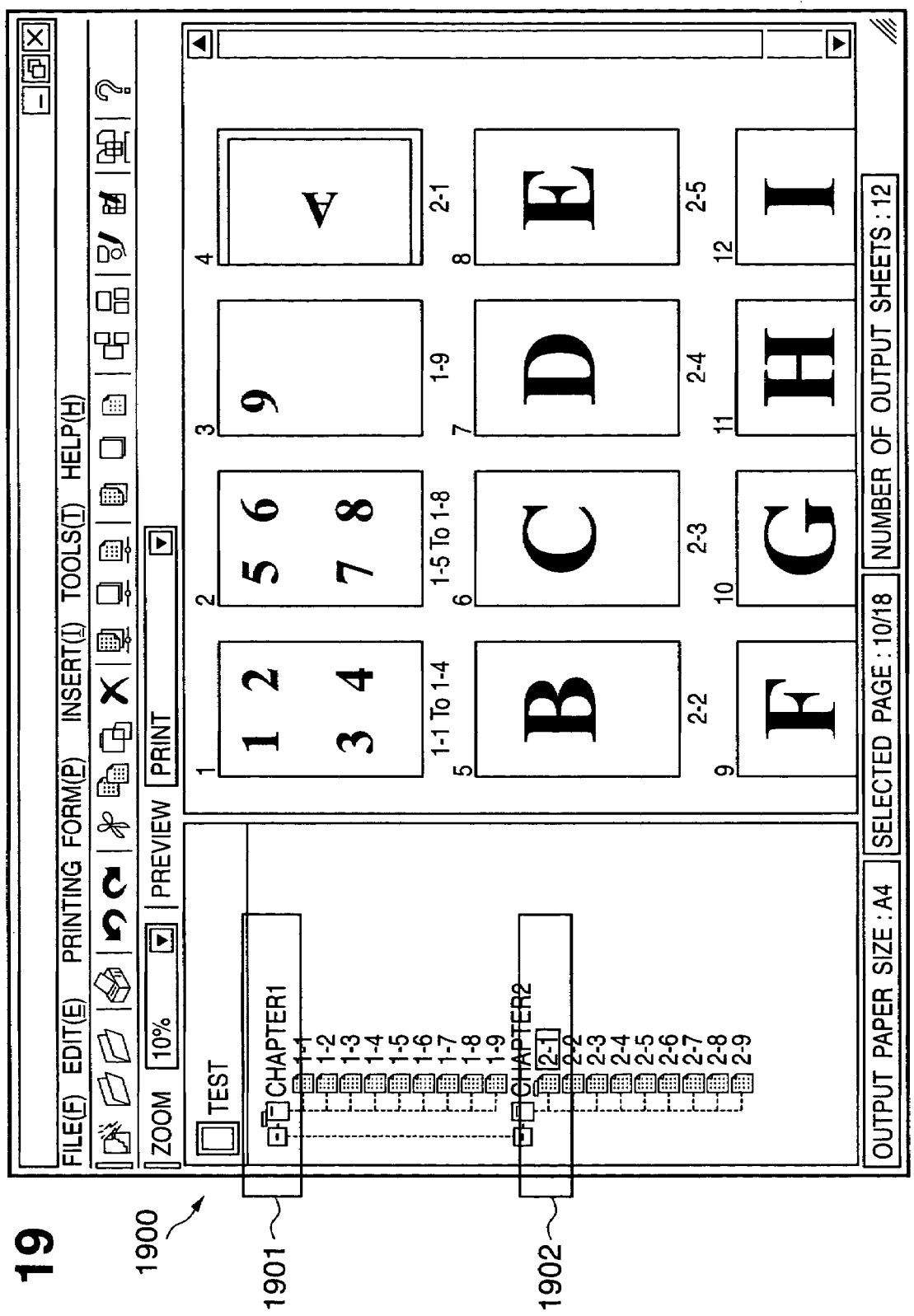
FIG. 19 is a view showing a display example when a setting unique to a chapter or page is performed.

FIG. 19 shows an example of the display format of the application when a setting item which is repeated in an upper layer does not use a setting value in the upper layer, i.e., when the check box control 1501 or 1701 is not checked.

In the example of FIG. 19, a document is formed by two chapters "Chapter1" and "Chapter2", and each chapter has original data of nine pages. FIG. 19 shows a display example when the layout of the first chapter is 4-up (to be also referred to as 4-in-1 hereinafter) and rotation is designated for the first page (10th page in the whole document) of the second chapter. Note that N-up and N-in-1 mean designation of laying out N original pages on one printing page.

At the preview portion on the right side of FIG. 19, four original pages are laid out on each of the first to third pages. On the fourth page, a character "A" is rotated.

The tree view displays a tree in a display format which clearly exhibits to the user an exceptional setting such as a setting unique to a chapter or page, i.e., a setting of a chapter different from that of the whole document or a setting of a page different from that of the whole document. More specifically, the icon of a chapter or page having an exceptional setting is displayed with a shape, color, or design visually identifiable from the icon of a chapter or page having no exceptional setting. In FIG. 19, an icon 1901 corresponding to the first chapter changes in shape to exhibit that this chapter has a unique setting. An icon 1902 corresponding to the first page of the second chapter also changes in shape to exhibit that this page has a special setting.

<Example of Editing Hierarchical Data Structure According to Embodiment>

An operation sequence by the user and a processing sequence by the system when a chapter is separated in the document processing system according to the embodiment will be explained.

(Example of Operation and Display in Chapter Separation)

Figure 20:
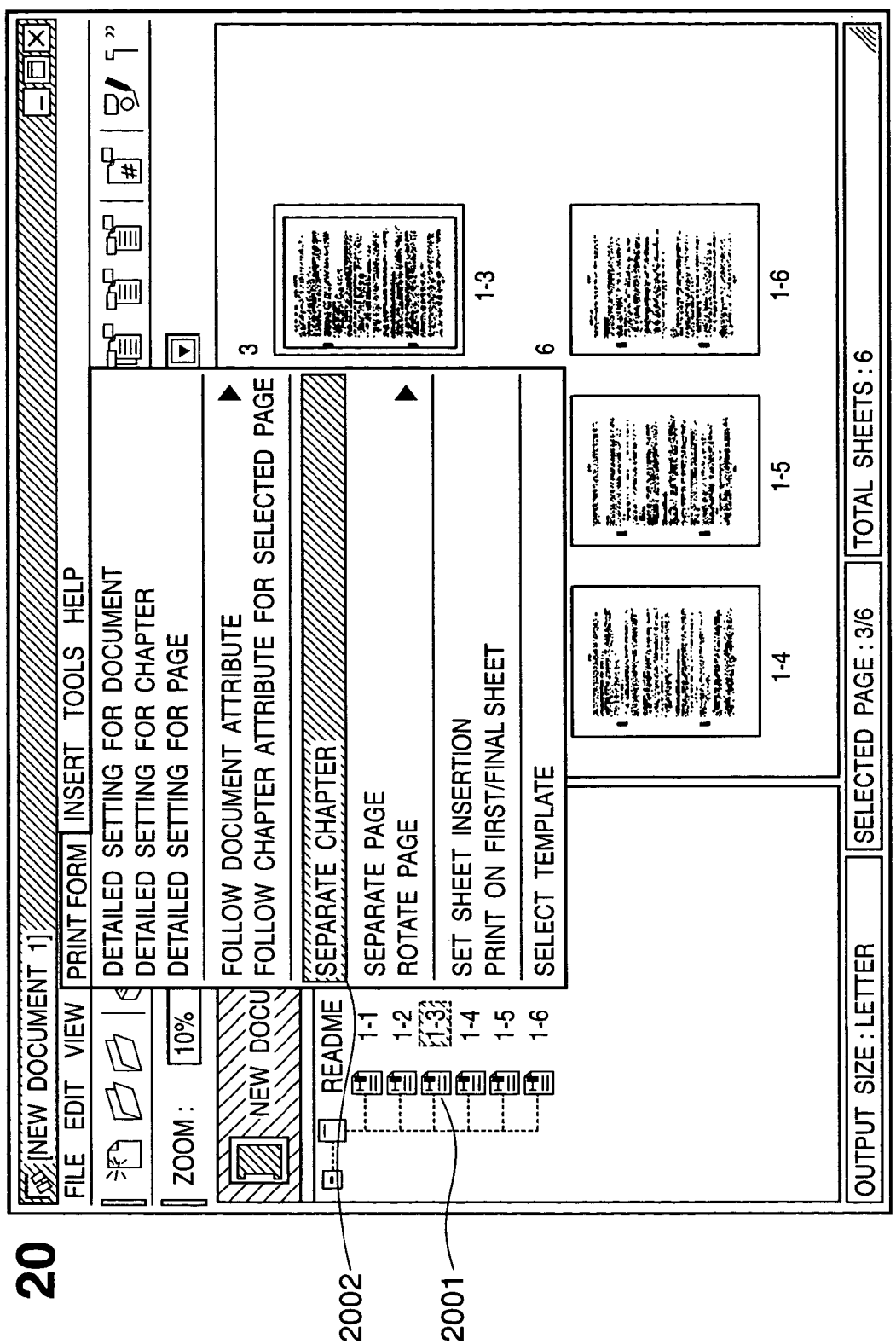
FIG. 20 is a view showing an operation example when a chapter serving as an intermediate layer is separated.
Figure 21:
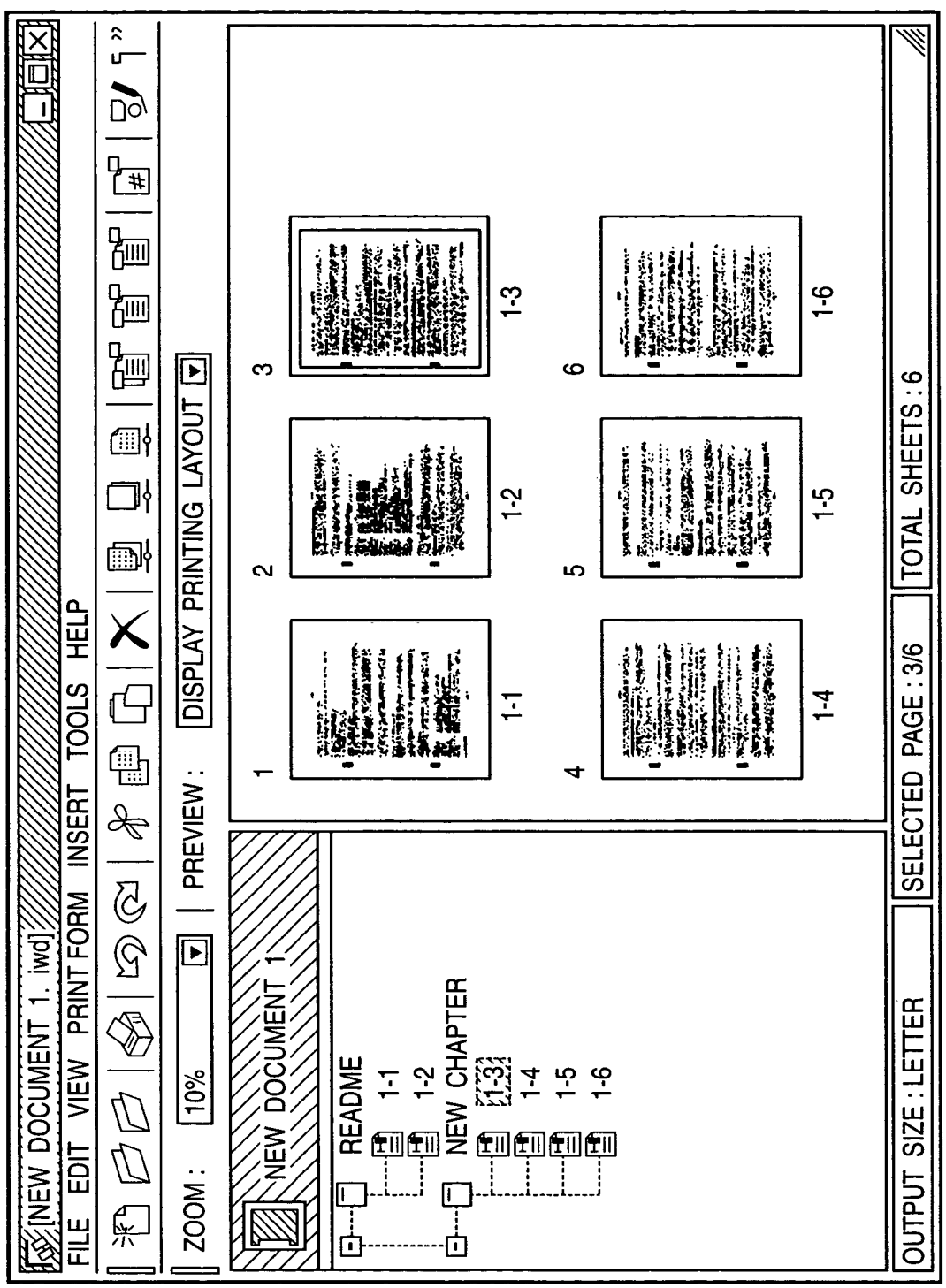
FIG. 21 is a view showing the operation example when the chapter serving as an intermediate layer is separated.

FIGS. 20 and 21 show an operation example of separating a chapter serving as an intermediate layer. FIG. 20 shows an example of a UI window when a document "New Document" is edited. In FIG. 20, a document structure to be edited is displayed in a tree display column on the left side of the UI window. In FIG. 20, the document contains only one chapter named "README", and the chapter contains six original pages. In a preview column on the right side of the UI window, the thumbnail images of the pages are displayed in a format defined by the attributes of layers set in the document. In the following description, a page means an original page (logical page).

In FIG. 20, while the user selects page 1-3 (2001), he/she selects "print form" from the menu. If the user selects "separate chapter" from the print form menu, the page 2001 and subsequent pages out of pages belonging to the chapter "README" containing the selected page 2001 are moved to a new chapter, thus separating the chapter "README" into two chapters, as shown in FIG. 21. In the display of the UI window, attributes set for the newly separated chapter and the document after chapter separation are also updated by reflecting the structure. In FIG. 21, the tree display portion additionally displays the newly separated chapter with a name "New Chapter" so as to belong to the document "New Document". In this example, the settings of each page belonging to the separated chapter are not particularly changed, and thus the preview display is not particularly changed. The attributes of the newly separated chapter can be set by several methods (to be described later).

These operation and processing sequences can be summarized as follows.

(1-1) The operator selects a page to designate an unmoved page group belonging to an original chapter to be separated, and a moving page group belonging to a chapter newly generated by separation.

(1-2) A new blank chapter is generated immediately after the chapter to be separated, and the designated moving page group is moved as a page group belonging to the new chapter.

(1-3) The edited document structure and preview are displayed.

These processes and operations can also be grasped as follows from another viewpoint.

(2-1) The operator selects a page to designate the insertion position of the new chapter, i.e., page group.

(2-2) A new blank chapter is generated at the position to which a chapter is to be inserted. The page group belonging to the chapter (to be referred to, as an original chapter) containing the selected page is separated into two at the selected page serving as a boundary. One page group is left in the original chapter, whereas the other page group is moved to the new chapter.

(2-3) The edited document structure and preview are displayed.

The new chapter display method depends on the attributes of the chapter. For example, when the chapter has an exceptional setting, as shown in FIG. 19, the icon of the chapter is displayed in a format representing the exceptional setting. In the following cases, the icon of a new chapter is displayed by an icon representing an exceptional setting.

(i) A new chapter inherits the attributes of an original chapter, and the attributes of the original chapter are not set to "follow document attribute" in, e.g., the check boxes 1501 and 1502 of FIG. 16 (i.e., the new chapter inherits an exceptional setting).

(ii) Predetermined default values are given to a new chapter, and include an exceptional setting.

When insertion of a slip sheet or index sheet between chapters is set as a book attribute (document attribute), a slip sheet or index sheet is inserted between an original chapter and a new chapter. In this case, the preview display window displays the slip sheet or index sheet between the chapters.

When the chapter separation position coincides with the boundary between original pages laid out on one sheet in an original chapter due to printing settings, pages are displayed in accordance with the "chaptering" setting value of the book attribute (document attribute) in the preview window displayed again after separation. For example, if chaptering is set to "no", the original pages of the original chapter and those of the new chapter are successively laid out unless a slip sheet or index sheet is inserted. If chaptering is set to "change page", the first original page of the separated chapter is laid out from the start of a new printing page, and displayed on the preview display. If chaptering is "change sheet", the first original page of the separated chapter is laid out from the start of a new sheet, and displayed on the preview display.

(Processing Sequence of Chapter Separation)

Figure 22:
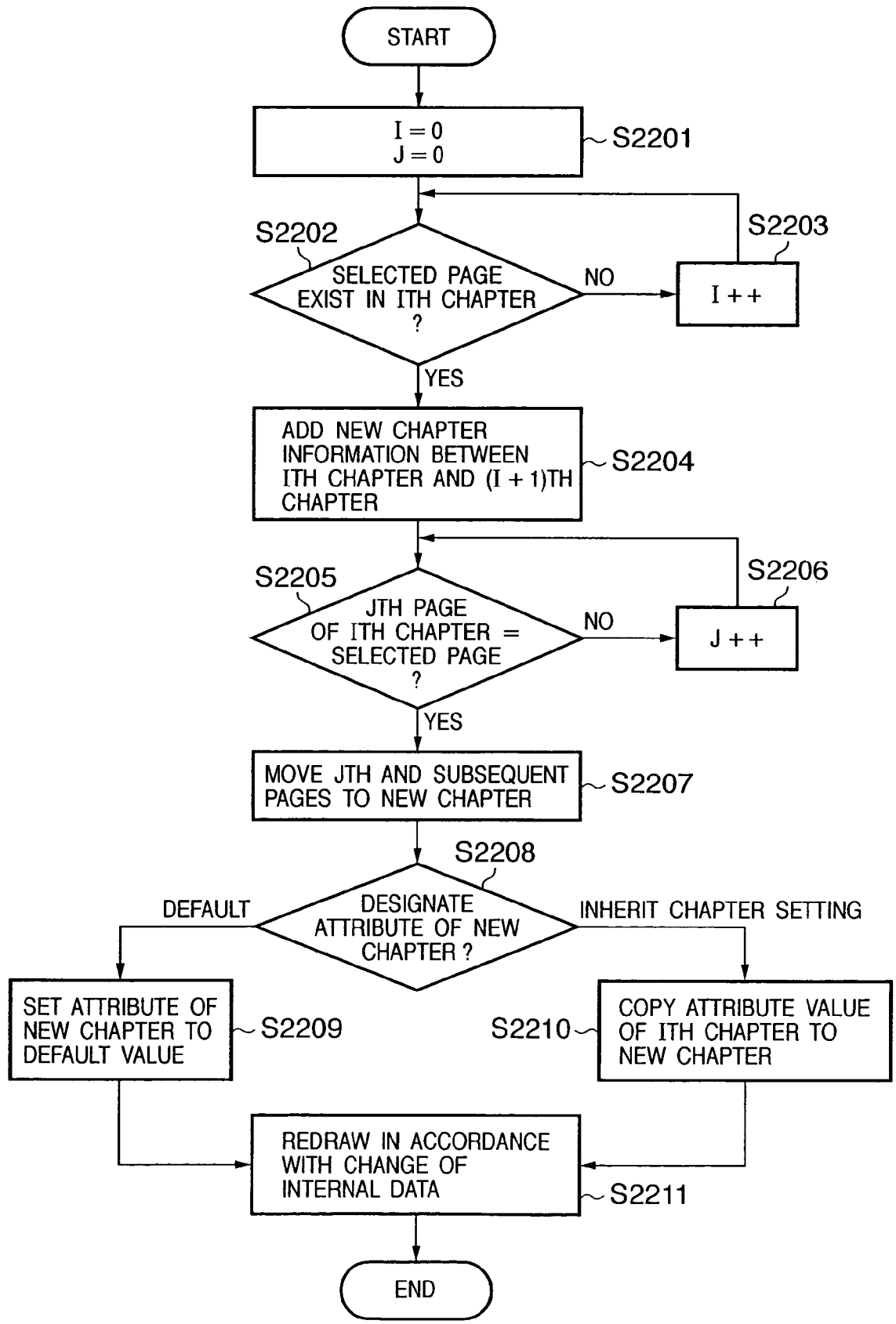
FIG. 22 is a flow chart showing processing of changing an internal data structure upon the operation shown in FIG. 20.

FIG. 22 is a flow chart showing processing of changing an internal data structure when the operation shown in FIGS. 20 and 21 is executed, i.e., a page is selected from a document during editing and chapter separation is designated. This processing is executed by the printing control application 104 in FIG. 1.

In step S2201, counters I and J are initialized. In this description, the counter starts from 0, which is common in the C language. Both the counters I and J are ensured in the work memory of the printing control application 104. The counter I represents the number of a chapter in a document to be edited, and the counter J represents the number of a page in a chapter of interest. In this example, the chapter number and page number reflect a document structure. In this case, the page number is different from a page number unique to each page that is assigned to determine the identity of a page. That is, the counter I represents the order of pieces of chapter information linked to the chapter information list 404 shown in FIG. 3. The counter J represents the order of pieces of page information linked to the page information list 408 for each chapter information 405 of each chapter.

In step S2202, the chapter information list 404 in FIG. 3 is sequentially examined to determine whether the currently selected page (corresponding to the page 2001 in FIG. 20) belongs to the Ith chapter information. If NO in step S2202, the processing advances to step S2203 to increment the counter I; if YES, to step S2204.

In step S2204, a chapter created after separation is added. New chapter information data is created and inserted between the Ith chapter information and the (I+1)th chapter information in the chapter information list 404. In the example of FIG. 3, for example, when a chapter (405 in FIG. 3) linked to the start of the chapter information list is to be separated, links to the second chapter information and subsequent chapter information are shifted by one in the chapter information list 404, ensuring a blank area for a new chapter in the chapter information list 404. New chapter information is then linked to the blank area. The chapter control information 406 and chapter setting information 407 of the newly created chapter information are set in the following steps.

The processing advances to step S2205 to examine the page information list 408 belonging to the Ith chapter information of the chapter information list 404 sequentially from the initial value of the counter J. If the Jth page has not been selected, the processing advances to step S2206 to increment the counter J. If the Jth page is determined in step S2205 to be a selected page, the processing advances to step S2207.

In step S2207, Jth page information and subsequent page information in the page information list are set as the page information list of the chapter information newly created in step S2204. The 0th to (J−1)th pages belong to the Ith chapter. If necessary, processing of maintaining the consistency of the internal structure by, e.g., setting the end of the page information list or updating information on the number of pages belonging to a chapter is performed.

The processing advances to step S2208 to determine the attribute setting method of the new chapter created in step S2204. If the attributes of the new chapter are determined to use default values, the processing advances to step S2209 to change the values of the chapter control information 406 and chapter setting information 407 to predetermined default values of the system. If the attributes of the new chapter are determined in step S2208 to inherit the attributes of the chapter containing the selected page, the processing advances to step S2210 to copy the chapter control information 406 and chapter setting information 407 of the Ith chapter to the new chapter. As a result, the internal structure has been updated, and then the processing advances to step S2211 to redraw the window and provide the latest information to the user. Display processing itself is executed by the operating system or display driver. The printing control application 104 performs processing of, e.g., setting a parameter for redrawing an image and calling an operating system function prepared for display processing.

To efficiently perform the above sequence, a page number unique to a page belonging to a chapter is given as chapter control information. The above determination can be achieved by only referring to the chapter control information without scanning any page information list.

(Reflection of Separation Operation on Job Ticket)

Although the processing sequence in FIG. 22 gives attention only to editing information file (book file), the document structure is also reflected in a job ticket structure stored as a page-storing file. Thus, the job ticket structure may also be changed simultaneously when a chapter is separated. The unit "chapter" in document editing information corresponds to a sheet bundle in the job ticket. However, this does not mean that respective chapters correspond to separate sheet bundles. Depending on the attributes of a document and chapter, a plurality of chapters correspond to one sheet bundle. Job ticket editing processing is also performed by the printing control application 104.

For example, document attributes (book attributes) include an index sheet attribute and slip sheet attribute. The index sheet attribute is an attribute for designating insertion of a tabbed index sheet separately prepared in the printing apparatus. The slip sheet attribute is an attribute for designating insertion of a sheet supplied from the inserter or sheet feed cassette.

To reflect these attributes in actual printing processing, not only the book file but also the job ticket structure must be changed in correspondence with the attribute values. That is, when one chapter is separated into a plurality of chapters, and, for example, no index sheet is set in the book attributes, a sheet bundle corresponding to an original chapter in the job ticket need not be changed even after separation. If, however, an index sheet is set, the sheet bundle corresponding to the original chapter in the job ticket is also separated into a structure corresponding to the separated chapter.

More specifically, if the job ticket may be divided, the book attributes include the setting of inserting an index sheet and the setting of inserting a slip sheet. The printing application 105 converts the page-storing file 103 into an OS output command, e.g., a Windows® GDI command, and calls a GDI function serving as a graphic engine by using the GDI command as a parameter. The graphic engine 121 causes the designated printer driver 106 to generate a command suited to a device (e.g., printer), and transmits the command to the device. At this time, a specific command such as insertion of an index sheet or insertion of a slip sheet cannot be effectively issued unless the insertion position is the break of a group, i.e., chapter having common parameters.

In separating a job ticket, the following processing is done.

The data structure of the job ticket is a list structure for the purpose of editing, similar to a document structure (see FIG. 3) defined in a file. A lower layer is linked to the node of an upper layer to form a tree. For this reason, a sheet bundle in the job ticket can also be separated by the same sequence as that in FIG. 22. Instead of the numbers of a chapter and page, the counters I and J represent the number of a sheet bundle belonging to a document of interest and the number of an original page belonging to the sheet bundle. FIG. 12 shows an example of the job ticket structure. In FIG. 12, the sheet information 1102 corresponds to a sheet bundle, and the plane information 1103 corresponds to a sheet. In the job ticket, an original page does not directly belong to a sheet bundle, and two, sheet and physical page layers are interposed between the original page and the sheet bundle. To scan original page information in the job ticket, the original page must be scanned for all sheets belonging to a sheet bundle of interest and all physical pages belonging to each sheet.

If an original page which coincides with a selected page is detected in the job ticket, a new sheet bundle node is linked immediately after a sheet bundle containing the original page, and the selected original page and subsequent original pages are so moved as to belong to the new sheet bundle.

Since sheet and physical page layers are interposed between a sheet bundle and an original page, a job ticket is separated as follows. A new sheet bundle after separation is generated and added to a document. In this description, a document, sheet bundle, sheet, physical page, and original page mean nodes containing pieces of corresponding information and settings in a job ticket.

(1) As for a sheet, all original pages of which belong to a new sheet bundle after separation, physical pages and original pages belonging to the sheet are moved to the new sheet bundle. Nodes belonging to the moved sheet are deleted from the original sheet bundle.

(2) As for a sheet, all original pages of which belong to the original sheet bundle, physical pages and original pages belonging to the sheet are left in the original sheet bundle.

(3) As for a sheet containing the separation position, information and settings of the sheet are copied and so added as to belong to the new sheet bundle. Physical pages belonging to the sheet are processed as follows.

(3-1) As for a physical page, all original pages of which belong to the new sheet bundle after separation, original pages belonging to the physical page are moved to the sheet added to the new sheet bundle in step (3). Nodes belonging to the moved physical page are deleted from the original sheet.

(3-2) As for a physical page, all original pages of which belong to the original sheet bundle, original pages belonging to the physical page are left in the original sheet.

(3-3) As for a physical page containing the separation position, information and settings of the physical page are copied and added to the new sheet added in step (3). Original pages to be separated are moved to the physical page. The moved original pages are deleted from the original physical page.

In this way, the sheet bundle of a job ticket is separated in accordance with chapter separation, as needed.

<Another Example (1) of Determining Selected Page>

Determination in steps (2) and (5) can be executed while the tree structure of a document is scanned. For example, attention is given to the Ith chapter information, and page information linked to the page information list is scanned. If a unique page number described in page control information belonging to the Jth page information and a page number unique to a selected page (number displayed at the tree portion and preview portion in FIG. 20) coincide with each other in the chapter of interest (Ith chapter information), the selected page can be determined to be the Jth page belonging to the Ith chapter. In this method, steps (1) to (6) in FIG. 22 can be replaced with the following steps.

(1') "0" is set in the counter I.

(2') "0" is set in the counter J.

(3') Whether the Jth page in the Ith chapter is a selected page is determined. This determination can be achieved using a number unique to a page.

(4') If the Jth page is determined in (3') to be a selected page, new chapter information is added between the Ith chapter and the (I+1)th chapter. After that, step (7) and subsequent steps in FIG. 22 are performed.

(5') If the Jth page is determined in (3') not to be a selected page, whether the page of interest is the final page in the Ith chapter is determined.

(6') If the page of interest is determined in (5') to be the final page, the counter I is incremented by one, and the processing is repeated from step (2').

(7') If the page of interest is determined in (5') not to be the final page, the counter J is incremented by one, and the processing is repeated from step (3').

This processing assumes that a selected page always exists in a document, and does not consider a case wherein no selected page can be detected in a document. In this case, an exceptional setting can also be added.

By the above processing sequence, according to the embodiment, a chapter containing a selected page can be easily separated by using the selected page as a boundary. This increases the operability and printing work efficiency.

If necessary, a page-storing file is also changed in accordance with separation operation. Even upon separation operation, printing settings of a document can hold a state before separation. All printing settings of a new chapter need not be performed again, increasing the operability and productivity.

All operations can be done on the GUI, and the user can perform editing work while confirming a document structure and the preview of each page in the window.

[Modification 1 to Embodiment]

The chapter attribute designation method is determined in step (8). The determination criterion may be a method of fixedly selecting either a default value or the attribute of a new chapter by the system or a method which allows the user to designate an attribute. For example, a system which can easily returns a chapter setting value to a default value can employ processing of fixedly copying a chapter attribute. In a system which can easily copy and paste a chapter setting, it may be convenient for the user to set a default value.

FIG. 23 shows an example of a setting GUI when the user designates the determination method in step (8). The first choice is setting of inheriting the setting of an original chapter. The second choice is setting of setting a default value. The third choice is setting which allows the user to designate a fixed setting value. In this case, if the user selects a "next" button, a chapter attribute setting GUI is opened to allow the user to designate a setting value. The set value is held as, e.g., one of book attributes, and referred in step (8) of FIG. 22. Setting on the GUI of FIG. 23 is executed as follows. For example, if "detailed setting for document" of the "print form" menu is selected in the window of FIG. 20, the GUI shown in FIG. 14 is displayed. This GUI includes an "edit" tag and allows editing settings. An "attribute setting method in chapter separation" select button is arranged in the GUI. If this button is clicked, the window of FIG. 23 is displayed to cause the user to select a setting.

With this processing, the user can determine the attributes of a new separated chapter with high operability.

[Modification 2 to Embodiment]

As the document editing operation method, the following method can also be adopted, in addition to the above method of designating a separation position from an existing chapter and separating the chapter at the position.

If the right button of the mouse is clicked while a page is selected, a menu including "separate chapter" is displayed to cause the user to select "separate chapter".

A page is operated by drag-and-drop operation of the mouse.

Preparation of these methods further increases user's convenience. In particular, the latter drag-and-drop operation realizes the following operations.

(1) The user selects a desired page (a plurality of pages can also be selected. In this case, discontinuous pages can also be selected) in a displayed document to be edited from the tree portion.

(2) The user moves (drags) the selected page, and designates (drops) a moving destination at the tree representing the document structure. During dragging, the current position during movement is so displayed as to allow specifying a position between pages with a visually specifiable cursor or the like.

This operation leads to the following result A or B.

(A) A page which has been dragged and dropped is moved to a designated position.

(B) A chapter is separated at the designated (dropped) position, a new chapter is created at this position, and the selected page is moved to the new chapter. The moved page is deleted from the original chapter. In this case, if the position designated by drop operation precedes the start page of the chapter or follows the final page, the original chapter is not separated.

Whether the operation result is A or B depends on predetermined setting. This setting may be done statistically by constituting the document processing system so as to operate with only A or B, or dynamically by a flag or the like settable by the user. In the latter case, the setting item is defined in, e.g., the book attribute. The setting can be selected through a GUI as shown in FIG. 23.

Operation (B) can also be understood as an operation of comprehensively performing three editing processes: chapter separation, insertion of a new chapter, and page movement as a series of processes. Editing processing "chapter separation" can also be grasped as a series of processes "insertion of a new chapter" and "page movement".

A processing sequence in the image processing apparatus according to the modification will be explained. In the description of the above embodiment, a chapter is separated. In separation processing, the insertion position of a new chapter and a page to be moved to the inserted chapter can be considered to be designated by one page selection operation. In the modification, the insertion position of a new chapter and a page to be moved to the inserted chapter can be considered to be designated independently. In the modification, processing is performed as follows.

(1) A chapter is separated at a designated insertion position. In the description of the above embodiment, a chapter is always inserted between existing chapters. In this modification, however, the insertion position may fall within a chapter. In this case, the existing chapter must be separated at the designated chapter insertion position. This separation is executed by the sequence of FIG. 22 or the sequence described as another example. The purpose of separation processing is to insert a new chapter, and two separated chapters inherit the attributes of the original chapter. In FIG. 22, only step (10) is selected.

(2) A new chapter is added between the separated chapters. The attributes of the new chapter are determined and given in step (8) and subsequence steps of FIG. 22.

(3) Pages in document editing information (see FIG. 3) are searched for a selected page to specify a corresponding chapter and page. The specified page is moved to the new chapter.

(4) The UI window is redrawn in accordance with a change of editing information. In redrawing, the structure of the edited document information is displayed at the tree portion, and the preview of each page is displayed at the preview portion.

The editing information file 111 is edited in this fashion. As described above, a job ticket saved as a page-storing file may be separated and inserted in accordance with separation and insertion of a chapter. This sequence is the same as that described above.

As described above, the operation of selecting a desired page from an existing document and inserting a new chapter to a desired position can be realized by simple drag-and-drop operation. That is, processing which has conventionally been performed in several operation steps can be realized by only one operation, increasing both the operability and productivity.

Note that the order of flow charts described in the embodiment can be changed as far as processing is completed.

The present invention may be applied to a system including a plurality of devices (e.g., a host computer, interface device, reader, and printer) or an apparatus (e.g., a copying machine, printer, or facsimile apparatus) formed from a single device.

The object of the present invention is also achieved when a storage medium which stores software program codes for realizing the functions of the above-described embodiment are read out and executed by the computer (or the CPU or MPU) of a system or apparatus. In this case, the program codes read out from the storage medium realize the functions of the above-described embodiment, and the storage medium which stores the program codes constitutes the present invention.

The storage medium for supplying the program codes includes a Floppy® disk, hard disk, optical disk, magnetooptical disk, CD-ROM, CD-R, magnetic tape, nonvolatile memory card, and ROM.

The functions of the above-described embodiment are realized when the computer executes the readout program codes. Also, the functions of the above-described embodiment are realized when an OS (Operating System) or the like running on the computer performs part or all of actual processing on the basis of the instructions of the program codes.

Also, the functions of the above-described embodiment are realized when the program codes read out from the storage medium are written in the memory of a function expansion board inserted into the computer or the memory of a function expansion unit connected to the computer, the CPU of the function expansion board or function expansion unit performs part or all of actual processing on the basis of the instructions of the program codes.

The present invention enables editing with setting values in separating and editing an intermediate node by utilizing the feature of hierarchically holding data and setting values when editing the hierarchical structure of a document in which data and setting values are hierarchically held.

A new separated node can inherit the setting value of an original intermediate node.

A predetermined setting value can be added to a new separated node.

While the image objects of either or both of a document structure and an original page contained in a document are confirmed on the display screen in editing a structured document, an original page and position on the displayed image objects are designated. The document is so edited as to insert a new group containing the designated original page to the designated position, and the edited document can also be confirmed on the display screen.

The present invention can provide a document processing method and system capable of editing with setting values in separating and editing an intermediate node by maximizing the feature of hierarchically holding data and setting values when the hierarchical structure is edited in a document processing system which hierarchically holds data and setting values.

That is, the present invention has the effect that a node in a hierarchical structure can be separated while data held in each layer of data having the hierarchical structure is set in a state desired by the user.

As many apparently widely different embodiments of the present invention can be made without departing from the spirit and scope thereof, it is to be understood that the invention is not limited to the specific embodiments thereof except as defined in the appended claims.

What is claimed is:

1. A document processing apparatus for a layer structured document having respective layers of a book, a chapter and a page, wherein a book contains at least one chapter having a specific attribute, each of at least one chapter contains at least one page, and each of at least one page has a print attribute, said apparatus comprising:

an instruction accepting unit which accepts an instruction of inserting designated data into a designated position of the layer structured document including the chapters from a user;

a determining unit which determines whether a type of the designated data is image data or data other than image data;

an editor which, responsive to a determination that the type of the designated data is data other than image data, edits the document so as to create a new chapter at the designated position of the document and then to insert a page formed with the designated data into the new chapter, and responsive to a determination that the type of the designated data is image data, edits the document so as to insert a page formed with the designated data into an existing chapter at the designated position of the document without creating a new chapter.

2. The apparatus according to claim 1, further comprising:

a display controller for controlling display of an object indicating a chapter in a structure of the document and an object indicating a page, and accepting a designation of a position on a display; and a processing unit for editing the document in accordance with a page and a designation of a position accepted on the display controlled by said display controller so as to insert a new chapter containing the designated page into the designated position, wherein said display controller further displays a selection window on which it can be selected whether the document is edited so as to insert a new chapter containing the designated page into the designated position, or the document is edited so as to move the designated page to the designated position in accordance with the page and the designation of a position accepted on the display controlled by said display controller, wherein said editor performs editing in accordance with a selection on the selection window, and wherein said display controller reflects a result of editing by said editor to the display.

3. The apparatus according to claim 1, wherein
the chapter has a chapter attribute, and
said editor causes the new inserted chapter to inherit an attribute of the chapter.

4. The apparatus according to claim 1, wherein
the chapter has a chapter attribute, and
said editor gives a predetermined attribute to the new inserted chapter.

5. The apparatus according to claim 1, wherein
the chapter has a chapter attribute,
said editor causes a display controller to display a selection window capable of selecting whether to cause the new inserted chapter to inherit an attribute of the chapter, or whether to give a predetermined attribute, and
said editor performs editing processing in accordance with selection in the selection window.

6. The apparatus according to claim 1, wherein
the chapter is made to correspond to a layer of a data structure having at least one chapter which forms a document, and
at least one page is made to correspond to a lower layer of the data structure of the chapter.

7. The apparatus according to claim 1, wherein
the type of data designated by said instruction accepting unit is determined to be either image data or data other than image data based on an extension of the data.

8. A document processing method for a layer structured document having respective layers of a book, a chapter and a page, wherein a book contains at least one chapter having a specific attribute, each of at least one chapter contains at least one page, and each of at least one page has a print attribute, said method comprising:

an instruction accepting step of accepting an instruction of inserting designated data into a designated position of the layer structured document including the chapters from a user;

a determining step of determining whether a type of the designated data is image data or data other than image data;

an editing step of, responsive to a determination that the type of the designated data is data other than image data, editing the document so as to create a new chapter at the designated position of the document and then to insert a page formed with the designated data into the new chapter, and responsive to a determination that the type of the designated data is image data, editing the document so as to insert a page formed with the designated data into an existing chapter at the designated position of the document without creating a new chapter.

9. The method according to claim 8, further comprising:
a display control step for controlling display of an object indicating a chapter in a structure of to document and an object indicating a page, and accepting a designation of a position on a display; and a processing step for editing the document in accordance with a page and a designation of a position accepted onto display controlled by said display control step so to insert a new chapter containing to designated page into the designated position, wherein said display control step further displays a selection window on which it can be selected whether the document is edited so as to insert a new chapter containing to designated page into the designated position, or to document is edited so as to move the designated page to the designated position in accordance with the page and the designation of a position accepted onto display controlled in said display control step, wherein editing is performed in said editing step in accordance with a selection on the selection window, and wherein a result of editing by said editor is reflected to the display in said display control step.

10. The method according to claim 8, wherein
the chapter has a chapter attribute, and
in the editing step, to new inserted chapter is caused to inherit an attribute of the chapter.

11. The method according to claim 8, wherein
the chapter has a chapter attribute, and
in the editing step, a predetermined attribute is given to the new inserted chapter.

12. The method according to claim 8, wherein
the chapter has a chapter attribute,
in the editing step, a selection window capable of selecting whether to cause the new inserted chapter to inherit an attribute of the chapter, or whether to give a predetermined attribute is displayed in a display control step, and
in the editing step, editing processing is performed in accordance with selection in the selection window.

13. The method according to claim 8, wherein
the chapter is made to correspond to a layer of a data structure having at least one chapter which forms a document, and
at least one page is made to correspond to a lower layer of the data structure of the chapter.

14. The method according to claim 8, wherein
the type of data designated by said instruction accepting step is determined to be either image data or data other than image data based on an extension of the data.

15. A computer-executable program stored on a computer readable storage medium, said program for causing a computer to process a layer structured document having respective layers of a book, a chapter and a page, wherein a book contains at least one chapter having a specific attribute, each of at least one chapter contains at least one page, and each of at least one page has a print attribute, wherein the program comprises:

code for an instruction accepting step of accepting an instruction of inserting designated data into a designated position of the layer structured document including the chapters from a user; and code for a determining step of determining whether a type of the designated data is image data or data other than image data;

code for an editing step of, responsive to a determination that the type of the designated data is data other than image data, editing the document so as to create a new chapter at the designated position of the document and then to insert a page formed with the designated data into the new chapter, and responsive to a determination that the type of the designated data is image data, editing the document so as to insert a page formed with the designated data into an existing chapter at the designated position of the document without creating a new chapter.

16. The program according to claim 15 further comprising:
code for a display step of controlling display of an object indicating a chapter in a structure of the document and an object indicating a page, and accepting a designation of a position on a display; and
code for a processing step of editing the document in accordance with a page and an designation of a position accepted on to display controlled by said display control step so as to insert a new chapter containing the designated page into to designated position,
wherein said display control step further displays a selection window on which it can be selected whether the document is edited so as to insert a new chapter containing to designated page into the designated position, or the document is edited so as to move the designated page to designated position in accordance with the page and the designation of a position accepted on the display controlled in said display control step,
wherein editing is performed in said editing step in accordance with a selection on the selection window, and
wherein a result of editing by said editor is reflected to the display in said display control step.

17. The program according to claim 15, wherein the chapter has a chapter attribute, and
in the editing step, the new inserted chapter is caused to inherit an attribute of the chapter.

18. The program according to claim 15, wherein the chapter has a chapter attribute, and
in the editing step, a predetermined attribute is given to the new inserted chapter.

19. The program according to claim 15, wherein the chapter has a chapter attribute,
in the editing step, a selection window capable of selecting whether to cause the new inserted chapter to inherit an attribute of the chapter, or whether to give a predetermined attribute is displayed in a display control step, and
in the editing step, editing processing is performed in accordance with selection in the selection window.

20. The program according to claim 15, wherein the chapter is nude to correspond to a layer of a data structure having at least one chapter which forms a document, and
at least one page is made to correspond to a lower layer of the data structure of the chapter.

21. The program according to claim 15, wherein the type of data designated by said instruction accepting step is determined to be either image data or data other than image data based on an extension of the data.

* * * * *